(12) United States Patent
Smith et al.

(10) Patent No.: US 9,268,016 B2
(45) Date of Patent: Feb. 23, 2016

(54) METAMATERIAL DEVICES AND METHODS OF USING THE SAME

(71) Applicant: DUKE UNIVERSITY, Durham, NC (US)

(72) Inventors: David R. Smith, Durham, NC (US); David Brady, Durham, NC (US); Tom Driscoll, San Diego, CA (US); John Hunt, Knoxville, TN (US); Alexander Mrozack, Durham, NC (US); Matthew Reynolds, Durham, NC (US); Daniel Marks, Durham, NC (US)

(73) Assignee: Duke University, Durham, NC (US)

( * ) Notice: Subject to any disclaimer, the term of this patent is extended or adjusted under 35 U.S.C. 154(b) by 226 days.

(21) Appl. No.: 13/891,165

(22) Filed: May 9, 2013

(65) Prior Publication Data

US 2013/0335256 A1    Dec. 19, 2013

Related U.S. Application Data

(60) Provisional application No. 61/644,736, filed on May 9, 2012, provisional application No. 61/753,584, filed on Jan. 17, 2013.

(51) Int. Cl.
*G01S 13/89* (2006.01)
*H01Q 15/02* (2006.01)
(Continued)

(52) U.S. Cl.
CPC ............... *G01S 13/887* (2013.01); *G01S 13/89* (2013.01); *H01Q 3/22* (2013.01); *H01Q 15/0066* (2013.01); *H01Q 15/0086* (2013.01)

(58) Field of Classification Search
CPC ..... G01S 13/88; G01S 13/887; G01S 13/888; G01S 13/89; H01Q 3/22; H01Q 15/0006; H01Q 15/006; H01Q 15/0066; H01Q 15/0086; H01Q 15/02; H01Q 15/04; H01Q 15/06; H01Q 15/08; H01Q 15/10; H01Q 15/12; H01Q 13/00; H01Q 13/02
USPC ........ 342/5, 11, 21, 22, 25 R–25 F, 175, 176, 342/179, 192–197, 13–15, 180, 368, 27, 28, 342/82, 89; 398/43; 359/237, 238, 240, 359/245, 276; 382/232, 233; 324/300, 307; 343/700 R, 772–786, 907, 908, 700 MS
See application file for complete search history.

(56) References Cited

U.S. PATENT DOCUMENTS 4,072,949 A * 2/1978 Van Brunt ...................... 342/15
4,866,448 A * 9/1989 Rocca et al. ................ 342/25 D
(Continued)

OTHER PUBLICATIONS

Hunt, John et al., Metamaterial Microwave Holographic Imaging System, Sep. 4, 2014, pp. 2109-2119, vol. 31, No. 10, Optical Society of America, U.S.
(Continued)

*Primary Examiner* — Bernarr Gregory
(74) *Attorney, Agent, or Firm* — Olive Law Group, PLLC

(57) ABSTRACT

Compressive imaging captures images in compressed form, where each sensor does not directly correspond with a pixel, as opposed to standard image capture techniques. This can lead to faster image capture rates due to lower I/O bandwidth requirements, and avoids the need for image compression hardware, as the image is captured in compressed form. Measuring the transformation of an emitted multimodal signal is one method of compressive imaging. Metamaterial antennas and transceivers are well suited for both emitting and receiving multimodal signals, and are thus prime candidates for compressive imaging.

27 Claims, 13 Drawing Sheets

(51) Int. Cl.
*H01Q 13/02* (2006.01)
*G01S 13/88* (2006.01)
*H01Q 15/00* (2006.01)
*H01Q 3/22* (2006.01)
*G01S 13/00* (2006.01)

(56) References Cited

U.S. PATENT DOCUMENTS

| | | | | |
|---|---|---|---|---|
| 5,079,735 | A | * | 1/1992 | Apostolos ............... 342/192 |
| 5,943,006 | A | * | 8/1999 | Crane et al. ............. 342/196 |
| 7,280,068 | B2 | * | 10/2007 | Lee et al. ................ 342/22 |
| 7,646,924 | B2 | * | 1/2010 | Donoho .................. 382/232 |
| 7,688,068 | B2 | * | 3/2010 | Beatty .................... 324/307 |
| 7,928,893 | B2 | * | 4/2011 | Baraniuk et al. .......... 342/25 F |
| 7,944,392 | B2 | * | 5/2011 | Falk ...................... 342/195 |
| 8,014,616 | B2 | * | 9/2011 | Chakraborty et al. ..... 382/233 |
| 8,681,047 | B2 | * | 3/2014 | Egri et al. ............... 342/368 |
| 2011/0123192 | A1 | * | 5/2011 | Rosenthal et al. ......... 398/43 |
| 2011/0267221 | A1 | * | 11/2011 | Brundick et al. .......... 342/180 |
| 2012/0019892 | A1 | * | 1/2012 | Bowers et al. ............ 359/276 |
| 2013/3352356 | | | 12/2013 | Smith et al. |

OTHER PUBLICATIONS

Candes, E. J., Compressive sampling; Proceedings on the International Congress of Mathematics, Madrid Spain, 2006, copyright 2006 European Mathematical Society, 20 pages.

Donoho, D. L. D., Compressed Sensing, IEEE Transactions on Information Theory. vol. 52:4, 1289-1306 (2006) http://ieeexplore.ieee.org/xpls/abs_all.jsp?arnumber=1614066.

Cull, C. F. et al., Millimeter-wave compressive holography, Applied Optics, vol. 49:19, E67-82 (Jul. 2010).

Candés, E. J., The Restricted Isometry Property and Its Implications for Compressed Sensing, Comptes Rendus Mathematique. 346, 589-592 (May 2008).

Brady, D. J. et al., Compressive Holography, Optics Express, Jul. 20, 2009, vol. 17:15, 10 pages.

Potter, L. C. and Parker, J. T., Sparsity and Compressed Sensing in Radar Imaging, Proceedings of the IEEE, vol. 98:Jun. 6, 2010; pp. 1006-1020.

Pendry, J. B. et al., Controlling Electromagnetic Fields, Science 312, 1780 (2006); DOI: 10.1126/science.1125907.

Driscoll, T. et al., Free-space microwave focusing by a negative-index gradient lens, Applied Physics Letters 88, 081101 (2066).

Kundtz, N. and Smith, D.R., Extreme-angle broadband metameterial lens, Nature Materials, vol. 9, Feb. 2010, pp. 129-132, published online Dec. 20, 2009; DOI:10.1038/NMAT2610.

Urzhumov, Y. and Smith, D.R., Metamaterial-Enhanced Coupling betweeen Magnetic Dipoles for Efficient Wireless Power Transfer, arXiv:1102.2281v2, physics.class-ph, Feb. 16, 2011; Physical Review B. 83, 31-33 (May 2011) http://prb.aps.org/abstract/PRB/v83/i20/e205114.

Narimanov, E., Metamaterials to beat the static, Nature Materials. 7 (Apr. 2008), pp. 273-274.

Takhar, D. et al., A New Compressive Imaging Camera Architecture using Optical-Domain Compression, (2006) 10 pages.

Chan, W. L. et al., A single-pixel terahertz imaging system based on compressed sensing, Applied Physics Letters 93, 121105 (2008), 93-95.

Chan, W. L. et al., A spatial light modulator for terahertz beams, Applied Physics Letters 94, 213511 (2009), 94-96.

Mahalanobis, A. et al., Off-axis sparse aperture imaging using phase optimization techniques for application in wide-area imaging systems, Applied Optics, vol. 48:Oct. 28, 2009, pp. 5212-5224.

Liu, R. et al., Gradient index circuit by waveguided metamaterials, Applied Physics Letters 94, 073506 (2009), 94-96.

Baena, J. D. et al., Equivalent-Circuit Models for Split-Ring Resonators and Complementary Split-Ring Resonators Coupled to Planar Transmission Lines, IEEE Transactions on Microwave Theory and Techniques, vol. 53:Apr. 4, 2005, pp. 1451-1461.

Bioucas-Dias, J.M. et al., A New TwIST: Two-Step Interative Shrinkage/Trhesholding Algorithms for Image Restoration, IEEE Transactions on Image Processing, vol. 16:Dec. 12, 2007, 2992-3004.

Padilla, W. J. et al., Dynamical Electric and Magnetic Metamaterial Response at Terahertz Frequencies, CM17.pdf, Optical Society of America, OCIS codes: (320.7150) Ultrafast spectroscopy; (230.1150) All-optical devices; IEEE, 1-55752-813-6, 2006.

Driscoll, T. et al., Memory Metamaterials, Science 325, 1518 (2009); DOI: 10.1126/science.1176580.

Chen, H-T. et al., Active terahertz metamaterial devices, Nature, vol. 444:Nov. 30, 2006, 597-600, DOI:10.1038/nature05343.

Shrekenhamer, D. et al., High speed terahertz modulation from metamaterials with embedded high electron mobility transistors, Optics Express, vol. 19:May 10, 2011, pp. 9968-9975.

Xu, Z. et al., Image reconstruction using spectroscopic and hyperspectral information for compressive terahertz imaging., J. Opt. Soc. Am. A, vol. 27, No. 7, Jul. 2010, pp. 1638-1646.

Willett, R.M. et al., Compressed sensing for practical optical imaging systems: a tutorial, Optical Engineering 50(7), 072601-1 (Jul. 2011).

* cited by examiner

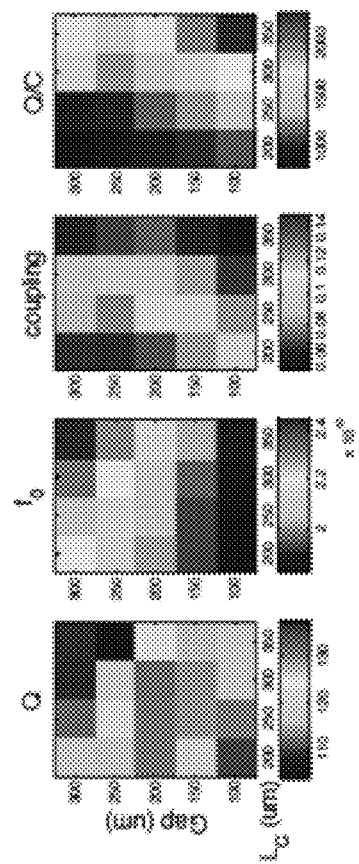
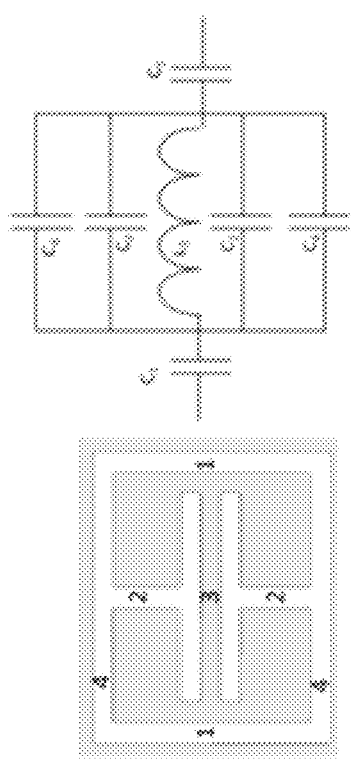
FIG. 18B
FIG. 18A

METAMATERIAL DEVICES AND METHODS OF USING THE SAME

CROSS REFERENCE TO RELATED APPLICATIONS

This application claims the benefit of U.S. Provisional Patent Application No. 61/753,584, filed Jan. 17, 2013 and titled METAMATERIAL DEVICES AND METHODS OF USING THE SAME, and U.S. Provisional Patent Application No. 61/644,736, filed May 9, 2012 and titled METAMATERIAL DEVICES AND METHODS OF USING THE SAME; the disclosures of which are incorporated herein by reference in their entireties.

TECHNICAL FIELD

The presently disclosed subject matter relates to metamaterials. More particularly, the presently disclosed subject matter relates to metamaterial devices and methods of using the same.

BACKGROUND

Radio frequency and millimeter wave (RF/mmW) imaging has been proven a highly effective component of non-invasive screening for human carriers of explosives, weapons and contraband. The performance of first generation scanners is limited, however, by high capital and operational costs; vulnerability to simple countermeasures; image artifacts and limited resolution due to obscuration and subject pose; and lack of target specificity. The use of mechanically scanned transceiver arrays results in limited update rate as well as large size and high cost. Mechanically scanned arrays are inherently higher maintenance sensors than a fully electronic solution.

Conventional imaging strategies may be segmented into confocal and Fourier designs. A confocal system scans targets point by point. Fourier systems use plane wave illumination to scan frequency space point by point. Both of these approaches are highly inefficient in terms of time and equipment usage. Modern imaging strategies treat image formation as a coding challenge, under which illumination and sampling geometry are programmed to maximize information transfer within temporal and geometric limits.

In view of the foregoing, there is a need for improved imaging systems and techniques.

SUMMARY

In general, one object of the present invention described herein comprises, consists of, or consists essentially of an aperture comprising means for creating an electromagnetic field distribution comprising a spatial field distribution, a matrix with a set of standard characteristics, captured data, a field of view, a signal to noise ratio of captured data, a resolution of captured data, a contrast of captured data, a rate of data capture, and a quality of captured data.

One embodiment of the invention comprises, consists of, or consists essentially of the aperture wherein said spatial field distribution is arbitrarily coded in frequency.

One embodiment of the invention comprises, consists of, or consists essentially of the aperture wherein said spatial field distribution comprises random fields.

Another embodiment of the invention comprises, consists of, or consists essentially of the aperture wherein the spatial field distribution comprises pseudo-random fields.

Another embodiment of the invention comprises, consists of, or consists essentially of the aperture wherein the spatial field distribution comprises wavelet patterns.

Yet another embodiment of the invention comprises, consists of, or consists essentially of the aperture wherein the said spatial field distribution comprises Fourier patterns.

One embodiment of the invention comprises, consists of, or consists essentially of the aperture wherein the means comprises a panel.

One embodiment of the invention comprises, consists of, or consists essentially of the aperture wherein the panel comprises a planar structure.

Another embodiment of the invention comprises, consists of, or consists essentially of the aperture wherein the panel comprises a flexible or conformal structure.

Another embodiment of the invention comprises, consists of, or consists essentially of the aperture wherein the panel comprises a mechanically robust structure sufficient to support traffic upon its surface.

Yet another embodiment of the invention comprises, consists of, or consists essentially of the aperture wherein the panel comprises a material of sufficiently low density to support mounting or hanging on or as architectural elements.

One embodiment of the invention comprises, consists of, or consists essentially of the aperture wherein the electromagnetic field distribution is reconfigurable.

One embodiment of the invention comprises, consists of, or consists essentially of the aperture wherein the reconfigurability adjusts the field of view.

Another embodiment of the invention comprises, consists of, or consists essentially of the aperture wherein the reconfigurability adjusts the resolution.

Another embodiment of the invention comprises, consists of, or consists essentially of the aperture wherein the reconfigurability adjusts a property that increases or decreases the rate of data capture while simultaneously decreasing or increasing the quality of the captured data.

One embodiment of the invention comprises, consists of, or consists essentially of the aperture wherein the property comprises the signal to noise ratio.

Another embodiment of the invention comprises, consists of, or consists essentially of the aperture wherein the property comprises said resolution in arbitrary bases of the captured data.

Another embodiment of the invention comprises, consists of, or consists essentially of the aperture wherein the property comprises the contrast of the captured data.

Another embodiment of the invention comprises, consists of, or consists essentially of the aperture wherein the property comprises matching of an analytic model to the captured data's true physical model.

Yet another embodiment of the invention comprises, consists of, or consists essentially of the aperture wherein the property comprises the matrix characteristics of the aperture.

One embodiment of the invention comprises, consists of, or consists essentially of the aperture wherein the matrix characteristics comprise the area under the singular value spectrum.

Another embodiment of the invention comprises, consists of, or consists essentially of the aperture wherein the matrix characteristics comprise the basis coherence.

Yet another embodiment of the invention comprises, consists of, or consists essentially of the aperture wherein the matrix characteristics comprise the subspace matching.

One embodiment of the invention comprises, consists of, or consists essentially of the aperture further comprising a designed mathematical array factor.

One embodiment of the invention comprises, consists of, or consists essentially of the aperture wherein the array factor comprises a means for frequency diversity.

One embodiment of the invention comprises, consists of, or consists essentially of the aperture wherein the frequency diversity means comprise a dispersion in said array elements.

Another embodiment of the invention comprises, consists of, or consists essentially of the aperture wherein the frequency diversity means comprise a dispersion in said signal source of said metamaterial transceiver.

One embodiment of the invention comprises, consists of, or consists essentially of the aperture wherein the array factor comprises a means for non-convolution based forward models with respect to tuning parameters.

One embodiment of the invention comprises, consists of, or consists essentially of the aperture wherein the model means comprises a beam pattern diversity comprising an over-determined set of the modes of the captured data.

Another embodiment of the invention comprises, consists of, or consists essentially of the aperture wherein the model means comprises beam pattern diversities that comprise maximizing side-lobes.

One embodiment of the invention comprises, consists of, or consists essentially of the aperture wherein the array factor comprises a means for an energy distribution across frequencies.

One embodiment of the invention comprises, consists of, or consists essentially of the aperture wherein the energy distribution means comprises a uniform distribution across the field of view.

Another embodiment of the invention comprises, consists of, or consists essentially of the aperture wherein the energy distribution means comprises an arbitrary coding scheme.

One embodiment of the invention comprises, consists of, or consists essentially of the aperture wherein the arbitrary coding scheme comprises randomly distributed fields.

Another embodiment of the invention comprises, consists of, or consists essentially of the aperture wherein the arbitrary coding scheme comprises pseudo-randomly distributed fields.

Another embodiment of the invention comprises, consists of, or consists essentially of the aperture wherein the arbitrary coding scheme comprises wavelet patterns.

Another embodiment of the invention comprises, consists of, or consists essentially of the aperture wherein the arbitrary coding scheme comprises Fourier patterns.

Yet another embodiment of the invention comprises, consists of, or consists essentially of the aperture wherein the arbitrary coding scheme comprises a sum of sinc functions.

Another embodiment of the invention comprises, consists of, or consists essentially of the aperture wherein the energy distribution means comprises a means for preferentially focusing on regions of interest within the field of view.

Another embodiment of the invention comprises, consists of, or consists essentially of the aperture wherein the energy distribution means comprises an adaptability within the field of view.

One embodiment of the invention comprises, consists of, or consists essentially of the aperture wherein the adaptability comprises a selection frequency subsets.

Another embodiment of the invention comprises, consists of, or consists essentially of the aperture wherein the adaptability comprises an external tuning stimulus.

Yet another embodiment of the invention comprises, consists of, or consists essentially of the aperture wherein the adaptability comprises an overcomplete signal set.

Another embodiment of the invention comprises, consists of, or consists essentially of the aperture wherein the energy distribution means work well with LFM ranging.

Another object of the present invention described herein comprises, consists of, or consists essentially of an antenna comprising an array of metamaterial elements capable of emitting and receiving signals.

One embodiment of the invention comprises, consists of, or consists essentially of the antenna further comprising the aperture as above, whereby the electrical field distribution is generated by the array of metamaterial elements.

Another embodiment of the invention comprises, consists of, or consists essentially of the antenna wherein the metamaterial elements are electrically reconfigurable.

One embodiment of the invention comprises, consists of, or consists essentially of the antenna wherein the electrical reconfiguration occurs on a unit-cell level, in blocks or sections, or in a continuous distribution across its expanse.

Another embodiment of the invention comprises, consists of, or consists essentially of the antenna wherein the array of metamaterial elements comprises means for frequency encoding.

One embodiment of the invention comprises, consists of, or consists essentially of the antenna wherein the frequency encoding means comprises frequency dispersive modes.

Another embodiment of the invention comprises, consists of, or consists essentially of the antenna wherein the frequency encoding means comprises single frequency diversity.

Yet another embodiment of the invention comprises, consists of, or consists essentially of the antenna wherein the frequency encoding means comprises a matrix with favorable properties when whitened.

Another embodiment of the invention comprises, consists of, or consists essentially of the antenna wherein the metamaterial elements comprise tunable elements via silicon tuning shottky diodes whereby said electrical reconfiguration is enabled.

Yet another embodiment of the invention comprises, consists of, or consists essentially of the antenna wherein the metamaterial elements comprise tunable elements via silicon tuning PN junctions whereby said electrical reconfiguration is enabled.

Another embodiment of the invention comprises, consists of, or consists essentially of the antenna wherein the metamaterial array elements comprise element designs which are advantageous for polarization selection.

Another embodiment of the invention comprises, consists of, or consists essentially of the antenna wherein the metamaterial array elements comprise element designs which are advantageous for unit-cell directivity.

Another embodiment of the invention comprises, consists of, or consists essentially of the antenna wherein the metamaterial elements are complementary metamaterial elements.

Another object of the present invention comprises, consists of, or consists essentially of a metamaterial transceiver comprising a signal source; the antenna as above; and a signal detector, wherein the signal source and the signal detector are operably connected to the antenna.

Another object of the present invention comprises, consists of, or consists essentially of a method of imaging using the metamaterial transceiver comprising emitting a multimode signal from the antenna and receiving a transformed signal after the multimode signal has been transformed by encountering a scene, and interpreting the transformed signal to generate an image of the scene.

One embodiment of the invention comprises, consists of, or consists essentially of the method of imaging further comprising placing the metamaterial transceiver on or in an architectural element, whereby images of objects are generated.

One embodiment of the invention comprises, consists of, or consists essentially of the method of imaging wherein the objects are capable of motion.

Another embodiment of the invention comprises, consists of, or consists essentially of the method of imaging wherein the scene comprises one or more objects in motion.

Another embodiment of the invention comprises, consists of, or consists essentially of the method of imaging further comprising assigning an image generation rate to the transceiver.

One embodiment of the invention comprises, consists of, or consists essentially of the method of imaging further comprising imaging one or more moving objects.

One embodiment of the invention comprises, consists of, or consists essentially of the method of imaging further comprising tracking moving objects.

One embodiment of the invention comprises, consists of, or consists essentially of the method of imaging further comprising dynamically assigning image generation rate using tracked moving object information.

Another embodiment of the invention comprises, consists of, or consists essentially of the method of imaging wherein the array of metamaterial elements is a two dimensional array.

Another embodiment of the invention comprises, consists of, or consists essentially of the method of imaging wherein the antenna is configured for compressive imaging.

Another embodiment of the invention comprises, consists of, or consists essentially of the method of imaging wherein the said antenna is configured for a combination of multiple multimodal imaging techniques.

Yet another embodiment of the invention comprises, consists of, or consists essentially of the method of imaging wherein the 72 wherein said antenna is configured for multiband sensing.

Another object of the present invention comprises, consists of, or consists essentially of a method of imaging comprising emitting a multimodal signal from a metamaterial transceiver comprising a two-dimensional array of complementary metamaterial elements; transforming the emitted multimodal signal by encountering a scene to be imaged; receiving the transformed signal by said metamaterial transceiver; and generating an image of the scene from the transformed signal.

Yet another object of the present invention comprises, consists of, or consists essentially of everything described and illustrated herein.

BRIEF DESCRIPTION OF THE DRAWINGS

The foregoing summary, as well as the following detailed description of various embodiments, is better understood when read in conjunction with the appended drawings. For the purposes of illustration, there is shown in the drawings exemplary embodiments; however, the presently disclosed subject matter is not limited to the specific methods and instrumentalities disclosed. In the drawings:

The foregoing aspects and other features of the invention are explained in the following description, taken in connection with the accompanying drawings, wherein:

In FIG. 13A, a network analyzer drives an illumination horn (port 1) and the metamaterial receiving aperture (port 2), making a measurement of $S_{21}$. Data is transferred to a PC which does scene reconstruction. FIG. 13B shows dimensions of the unit-cells in mm, where $I_y=1.2$, $I_x=2.2$, $w_1=0.2$, $w_2=0.1$, and $p_x=2.8$. $g_x$ can vary from 0.5 to 1.5 and controls the cELC resonant frequency.

FIG. 14C shows a plot of the measurement-matrix (E-field aperture) across the entire K-band—measured at a range of 4 m.

FIG. 17A depicts a representation of an example transfer-matrix, showing a long transmission line of voltage nodes punctuated by the cELC unit-cells. Each unit cell is expressed as a 2×2 T-matrix, whose parameters are found by finite-element simulation. FIG. 17B shows a transfer-matrix solution for the electric field in waveguide, evaluated at the center of each cELC, and the resulting electric-field on the surface of aperture.

FIGS. 18A and 18B show the design of the cELC unit cell and optimization matrix of said unit cell, respectively, in accordance with an embodiment of the present disclosure. FIG. 18A shows an effective circuit model of the cELC to help understand qualitatively the relation between geometries and unit-cell response. FIG. 18B shows an optimization matrix for the design geometries $w_2 l_1$.

FIG. 19A shows the error surfaces for both imaging modes. FIG. 19B shows the best imaging mode versus sampling percent and noise. It is evident that for undersampled scenes, the metamaterial aperture imager out performs the scanned beam imagers, provided the noise power is below a critical level—at which point the reconstruction error of the metamaterial imager rapidly increases.

DETAILED DESCRIPTION

Figure 1:
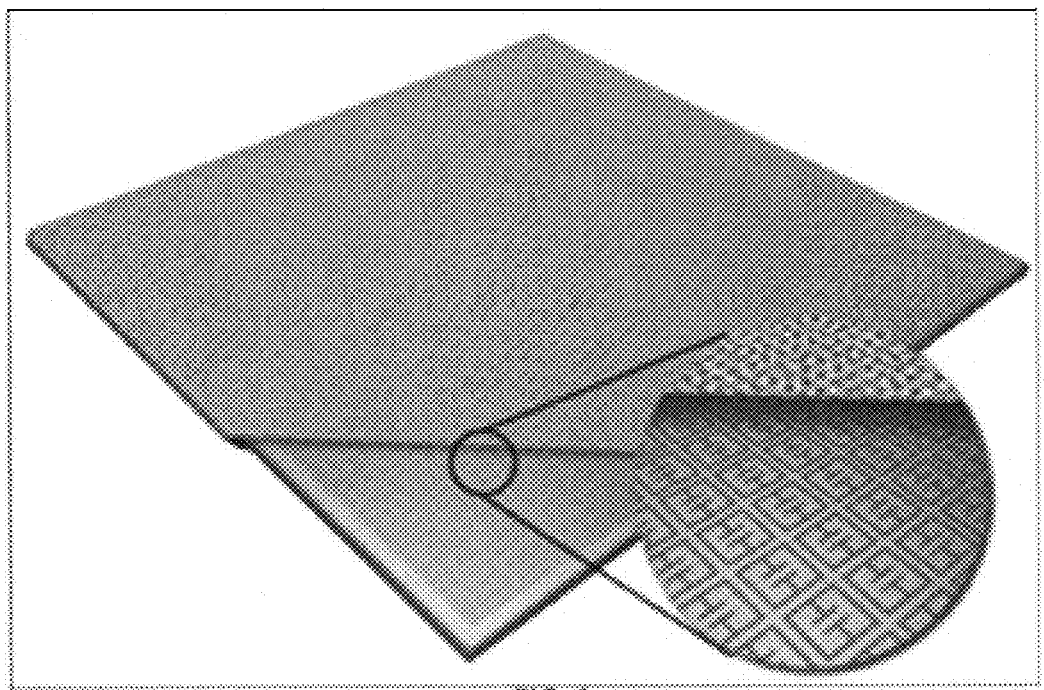
FIG. 1 is a depiction of a flat panel metamaterial antenna, with inset highlighting the metamaterial elements underneath the overcoating. An overcoating can be used to mask the presence of the antenna.

For the purposes of promoting an understanding of the principles of the present disclosure, reference will now be made to preferred embodiments and specific language will be used to describe the same. It will nevertheless be understood that no limitation of the scope of the disclosure is thereby intended, such alteration and further modifications of the disclosure as illustrated herein, being contemplated as would normally occur to one skilled in the art to which the disclosure relates.

Embodiments of the present subject matter provide an approach to imaging system design for development of compressive imaging systems for optical spectroscopy and spectral imaging, holography and millimeter wave imaging, x-ray tomography, and human tracking and identification. Compressive imaging is possible because natural images are always representable using dictionaries or bases of much lower complexity than the raw pixel map. Measured data is never truly random; a classic example of this fact is that natural images can be stored much more efficiently on a non-Canonical basis such as the discrete cosine transform (DCT) or Haar Wavelet basis. The advantages of representing images in specified bases have been established in the context of post-measurement image compression. Compressive measurement pushes data compression into the physical measurement layer.

As suggested by the term, compressive measurement consists of estimating image pixels in quantity greater than the number of measurements. Multiplex measurement, which measures scene pixels in linear combination, is generally necessary to compressive sampling. Millimeter wave imagers, and other coherent or afocal systems, are amenable to compressive sampling. In a compressive measurement system, the measurement process can be thought of as a process that is a composite of two linear projections. For example, consider the measurement model g=Hf where H=ΦΨ. The matrix H=ΦΨ projects f into the canonical basis from the basis on which it is sparse. The matrix Φ is the physical sensing matrix. The system designer is free to choose the both the sparsifying transform $\Psi^{-1}$ and the sensing matrix Φ within physical design constraints. For low-cost, single pixel RF and mmW compressive imaging, available physical coding parameters can include transceiver radiation patterns and operating frequencies.

Video and motion tracking are also particularly amenable to compressed sensing. Video may be imagined as a high dimensional space-time image. For the particular case of mmW imaging of human targets, temporal frames involve smooth transformations of solid surfaces. This data cube of smooth distortions of surfaces embedded in 4D space-time is extremely sparse and may be captured and reconstructed with effective compression ratios of several orders of magnitude if effective multiplex coding is implemented. This process is particularly important for imaging humans in motion because multidimensional analysis may achieve much better effective resolution of a single time frame of uncompressed (but occluded) data.

Compressive video using camera arrays and compressive video tomography in holographic and hyperspectral systems can be achieved. Further, in hyperspectral data, substantial advantages may be obtained by direct decompressive inference of classification data rather than images. Adaptive coding and classification from compressed measurements can be particularly attractive for mmW systems.

Metamaterials—which have emerged in the context of artificial electromagnetic media—offer a clear fit to compressive imaging systems, since they allow unparalleled flexibility in the management of waves across the electromagnetic spectrum. A metamaterial aperture can be configured to have specific desired scattering properties at either a given wavelength or across a frequency band, and hence have scattered field patterns that can be sculpted to maximize the efficiency of the compressive imaging system.

Articles "a" and "an" are used herein to refer to one or to more than one (i.e. at least one) of the grammatical object of the article. By way of example, "an element" means at least one element and can include more than one element.

Unless otherwise defined, all technical terms used herein have the same meaning as commonly understood by one of ordinary skill in the art to which this disclosure belongs.

As used herein, the term "compressive imaging" means acquiring an image with fewer sensors than measured points. When considering a standard CCD, it directly maps each captured point of the scene it is measuring to a specific pixel of the CCD, whereas compressive imaging captures more than one point of data indirectly coupled to one or more sensors. It is called compressive, because like image compression is used to reduce the data size of non-compressed images: Compressive imaging reduces the data size of captured images, but does this as a part of image acquisition the image is acquired. The enumeration of the measured dataset and compression are often considered in a basis other than the canonical basis of the scene or aperture.

Figure 3:
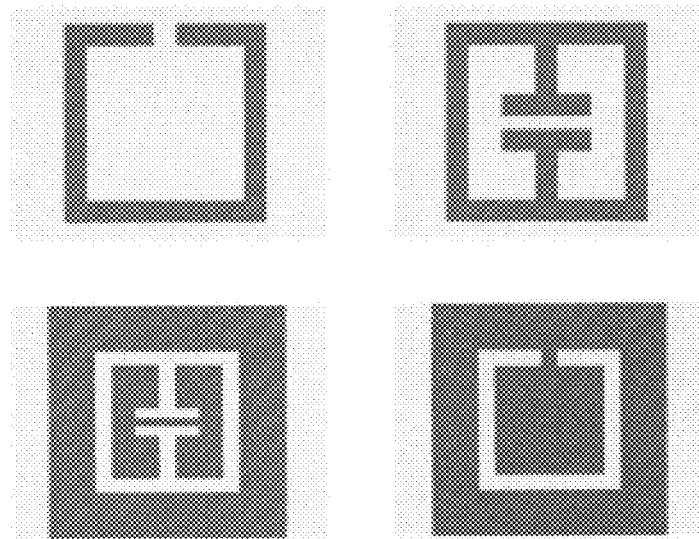
FIG. 3 depicts example bulk metamaterial elements on top and their complements on bottom.

As used herein, the term "cELC" means complementary metamaterial element, which comprise the many of the properties of like standard metamaterials, but are the shape's complement, such as in FIG. 3, bottom.

One object of the present invention comprises an aperture that creates an electromagnetic field distribution, designed to access measurement data pertaining to a scene. This may include illumination, data receiving, or both (transceiver). In some embodiments the spatial field distribution may be coded arbitrarily in frequency, including but not limited to: random fields, pseudo random fields, wavelet patterns, and Fourier patterns. In some embodiments the physical manifestation of the aperture may be planar, flexible, conformal, mechanically robust enough to support ground deployment and perhaps human or vehicular traffic, or of sufficiently low density or weight to allow hanging on or as architectural elements. In some embodiments the aperture may be reconfigurable in ways that include: adjusting the field of view; changing the resolution; and adjusting an attribute that affects the speed/quality tradeoff of data capture such as signal to noise ratio, resolution in arbitrary bases, contrast, matrix characteristics like the area under the singular value spectrum or the basis coherence or subspace matching, or adjusting the matching of the analytical model to the true physical model.

Another object of the present invention comprises the design of a mathematical array factor expressed in the panel or aperture. In some embodiments the array factor may grant frequency diversity (the rate of change of the electromagnetic mode distribution) by such methods as dispersion in array elements, dispersion in the energy feeding or input structures, or others. In some embodiments the array factor may allow for non-convolution based forward modeling with respect to tuning which may include beam pattern diversity that is an over determined set of the scene modes, beam pattern diversities that maximize side lobes (which is counter to conventional methods), or others. In some embodiments the array factor may give a particular energy distribution that when integrated across all frequencies can be: uniformly distributed across the field of view; arbitrarily coded in energy distribution schemes which include but are not limited to randomly distributed fields, pseudo-randomly distributed fields, wavelet patterns, Fourier patters, approximations of any of the above via sums of sinc functions, sums of sinc functions, and others; preferentially focused to regions of interest within the field of view; adaptably directed within the field of view by means of subsets of frequencies selected, by means of external tuning stimulus including but not limited to voltage, by means of an overcomplete signal set, or others; in forms which work well with LFM ranging including but not limited to bands of contiguous directivity; or others.

Figure 4:
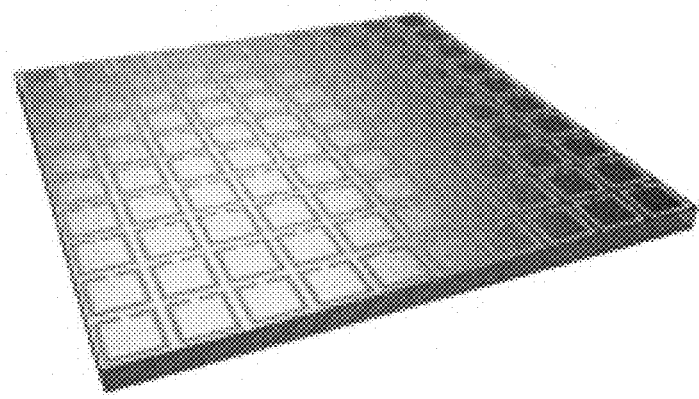
FIG. 4 is a planar metamaterial waveguide on top and a microstrip transmission line on bottom.
Figure 4:
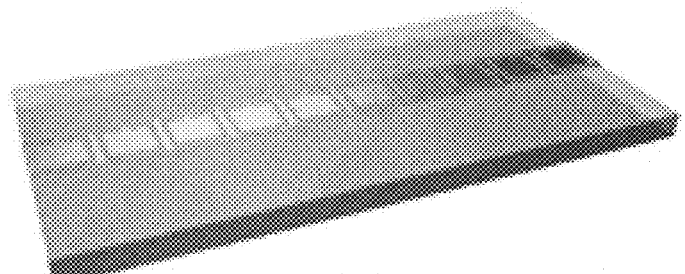

Another object of the present invention comprises an antenna comprising an array of metamaterial elements. The metamaterial elements can be individually and uniquely designed. This allows for a wide range of signals, for example frequency dispersive modes, to be generated and received. The metamaterial elements can be used to generate and observe frequency-encoded signals, including frequency dispersive modes, single frequency diversity, a matrix with favorable properties when whitened, or others. The metamaterial elements can be designed with polarization selection, unit-cell directivity, or other properties in mind. The emission stimulation signal and the received measured signal can operate on the same hardware if this antenna is used to emit a signal and receive a signal transformed by encountering the scene. Complementary metamaterial elements (FIG. 3, bottom two) can be used to simplify the design, as can be seen in FIGS. 1 and 4. This antenna can comprise the aperture previously discussed, by using the metamaterial elements to generate the electric field distribution. Additionally, the antenna's array of metamaterial elements can embody the mathematical array factor discussed previously.

Another object of the present invention comprises a metamaterial transceiver. The antenna above can be used in a transceiver, wherein a generated signal can be transformed by a scene and then observed by the same metamaterial antenna. This transceiver might be used to generate a multimode signal. Metamaterial technology enables large, flat panel fixed-aperture arrays capable of leveraging frequency diversity for single pixel compressive measurements, vastly decreasing the cost and complexity of RF/mmW imaging. An example of this in a two-dimensional metamaterial element array is FIG. 1. The transceiver can be configured for compressive imaging, for using multiple multimodal techniques, multiband sensing, and others. With the metamaterial transceiver, image frame rates are no longer limited by mechanical scanning and can in theory be extended to 100 s or 1000 s of frames per second. These high frame rates offer the potential for mmW imaging on un-posed moving subjects. The metamaterial transceiver can be placed on or in architectural elements, and can be used to observe moving objects. An image generation rate can be adjustable with this transceiver. Moving objects can be tracked, and an image generation rate can be changed dynamically by using information about the tracked objects, which is particularly useful for accurate observations of faster moving objects.

Another object of the present invention comprises a metamaterial antenna with electrically reconfigurable metamaterial elements, which can provide a dynamic aperture. The reconfigurability can be by unit-cells, blocks, sections, in a continuous distribution across the antenna, or other methods. Reconfigurability can be implemented with a liquid crystal approach that leverages existing display technology and can be integrated with the metamaterial aperture to form a dynamic aperture, which can be dynamically reconfigurable allowing operation in single frequency modes. This reconfigurability of the aperture can also be implemented with silicon tuning shottky diodes or silicon tuning PN junctions, or others.

Another object of the present invention is design specific hardware. In particular, the aperture, antenna, or transceiver above can be part of an RF chain.

Another object of the present invention is compressed sampling. The image reconstructive function can be designed to match the coding of the transceiver, aperture, or antenna. The images can be both compressed and encrypted by the hardware-level encryption and compression in the image sampling, especially when the image is sampled pseudo-randomly. This encryption can be used to secure private or militarily important information, and can even be processed entirely by computers, only reconstructing images for human eyes when anomalies or dangerous elements may be detected. The metamaterial transceiver provides an ideal physical layer to enable compressive imaging schemes. Compressive imaging reduces deployment and operational costs by enabling imaging with many fewer transceivers and measurements than current technology, as well as enabling image acquisition in unstructured environments and automated image analysis and classification. The basis of the compressed sampling can be designed to: respond to targets of interest; minimize scene interference such as multipath; have a field that is null-scanning, possibly to deal with speckle; have an adaptive basis which is chosen based upon visible or infrared information of the scene; or others. The calibration of the compressed sampling can use either a known target or a boundary value.

Another object of the present invention is multispectral imaging. Multiple spectrums of information can be used to assist with certain portions of imaging, for example to define the area of interest. An advantage of this aperture, antenna, or transceiver is that the multispectral imaging sources and receivers can be located in the same position, giving the same perspective. As an example, a known area of interest as defined by visible information, say a terrorist carrying a bomb in a crowd of people, can be used to target the exact same area of interest, say with millimeter wave imaging, without having to adjust position, angle, etc. Additionally, information used to identify a potential interesting artifact can then directly translate to another spectral band. In the above example, this technique might be used to identify the face and clothes of the potential bomb carriers in a crowd. Finally, the multispectral imaging can utilize polarmetric techniques to aid in material identification.

Yet another object of the present invention comprises a fusion of multimodal imaging techniques. Visible and infrared images can be combined with multiband data to mitigate certain forms of wavelength-specific cloaking and deception and, in conjunction with adaptive target-specific multipath scatter modeling, multimodal fusion enables diffraction limited imaging in the presence of obscuration.

Another object of the present invention comprises multiband sensing. The low cost of single pixel metamaterial transceivers over the gigahertz and millimeter range enables wavelength-limited imaging from sparse or limited apertures as well as material specificity based on dispersion and absorption signatures.

Yet another object of the present invention comprises advanced radio frequency (RF) and millimeter wave (mmW) imaging systems based on a scalable, planar metamaterial transceiver uniquely compatible with compressive imaging schemes (a "metaImager," depicted in FIG. 1) that enables a wide variety of imaging modalities. We have recently demonstrated a metaImager that uses a fixed aperture design in preliminary, one-dimensional (1D) imaging measurements at X-band (8-12 GHz) frequencies. We propose to transition this fundamental research into a functional platform capable of meeting mission requirements across a wide spectrum of security related applications.

The following examples are offered by way of illustration and not by way of limitation.

Example 1

The MetaImager

The metaImager consists of a thin sheet forming a planar waveguide that is fed by a single RF or mmW source and coupled to a single detector. The upper conductor of the waveguide is patterned with an array of metamaterial elements, each of which acts like a dipolar source, producing a well-defined radiation pattern. The metaImager can operate in two modes. The first is fixed aperture, in which the scattering properties of the metamaterial elements are fixed by their geometry. In fixed aperture operation, multiple frequencies over a predetermined bandwidth are used to modulate the radiation efficiency of the metamaterial elements, and thus scene information is encoded across the frequency bandwidth. In a second more advanced mode, which we term dynamic aperture, elements are electrically reconfigured via external digital control, giving a means of adjusting the beam pattern at a given frequency and generating multiple spatial profiles for a singular carrier frequency. This dynamic modality allows adaptive optics (with no moving parts or high-cost phase shifters) as well as hyper-spectral imaging—adding the potential to identify material characteristics within a scene. Embodiments of this technology are described below.

Figure 2:
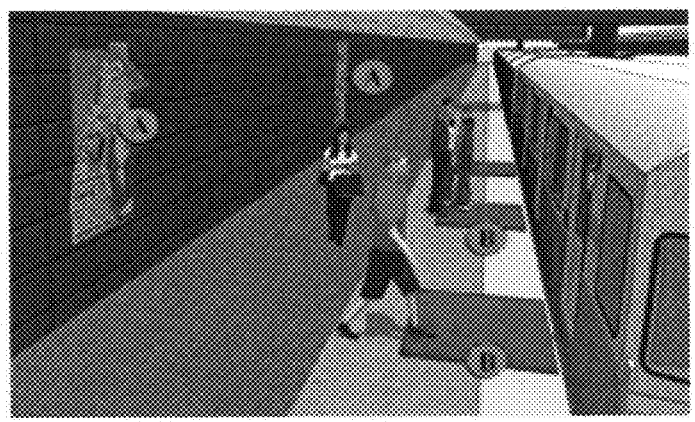
FIG. 2 is a diagram of places the metamaterial transceiver-based imagers can be used to image people for security purposes.
Figure 2:
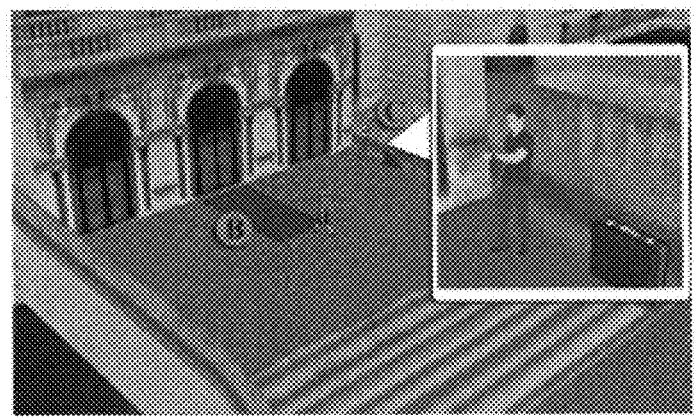

The compact footprint and low production cost of the metaImager system—enabled by the elimination of bulky mechanical scanning, delicate conventional optics, and expensive phased-array electronics—allow widespread and inconspicuous deployment over a wide range of security scenarios. The thin width of the transceiver panel at the heart of the metaImager allows placement in a variety of locations. Referring to FIG. 2, the metaImager may be deployed on walls A, floors and on the ground B, and with man-portable units C.

One of the most enticing deployment possibilities is on walls—inconspicuously behind posters or built into structural sections. The panel itself comprises only a small fraction of the total unit-cost, enabling widespread flexible deployment "by the square foot." Longer observation times with a variety of subject poses can be obtained by integrating data acquired as a subject walks past a long panel of metaImagers.

The elimination of any delicate optics or mechanical parts makes the metaImager panel robust enough to survive physical interaction with its environment. Ground deployment, either built into ramps or walkways, or potentially even simply placed under floor coverings such as rugs, gives placement possibilities even in open areas. The ground deployment offers a unique vantage point for imaging regions of the body that are difficult or impossible to image with conventional portal techniques.

The lightweight nature of the metaImaging panel—absent heavy conventional scanning components—presents the possibility of man-portable units. Server-side hardware-implemented image processing can potentially enable remote operation.

The metaImager is a powerful platform for compressive video tomography. metaImager takes projections one mode at a time. Each projection may be adaptively programmed based on the current state of the scene and past measurements. Each time a projection is taken, the current frame can be reconstructed on whatever timescale the operator chooses, providing an easy way to trade between temporal and spatial resolution as application dictates. DISP has previously explored similar tradeoffs in experiments with the multi-acquisition Coded Aperture Snapshot Spectral Imager (CASSI).

Some of the anticipated attributes of the combined metaImager system are:

| Anticipated Properties of metaImager | |
|---|---|
| Single Transceiver Operation | Only one source/detector needed for operation, greatly reducing the cost of the imaging system and support electronics |
| Fixed Aperture Mode | Spatial images are encoded using frequency bandwidth, allowing for ultimately low-cost, robust systems across large areas |
| Dynamic Aperture Mode | Reconfigurable metamaterial enables adaptive beam-forming, allowing hyper-spectral imaging and scene flexibility |
| Low Cost | Minimal RF components needed; industry standard lithography and materials used for metamaterial panel; leverages existing display technologies for dynamic operation |
| Large Aperture | Larger areas can be covered with low-cost panels, with little increase in associated electronics and support costs |
| Low Profile, Conformal | Elimination of traditional optics and moving parts gives panels minimal thickness; design flexibility of metamaterial arrays allows panels to be shaped for a wide variety of geometries and footprints, facilitating easy camouflage |
| Smaller Footprint | Efficient use of aperture and use of single source/detector requires vastly fewer electronic components and minimal support hardware, allowing flexibility in placement and opening the potential for man-portable units capable of standoff target evaluation |
| Adaptive Modes | Allows reprioritization of image data for different scenes, illumination and targets |
| Hyperspectral Mode | Spectroscopic data over RF and mmW bands can be acquired simultaneously with spatial images, allowing material identification |
| In-Motion Imaging | Combining space-time compressive imaging techniques, metaImager can image subjects in motion, avoiding "posing" delays |
| Scene Encryption | metaImager performs encryption of the scene at the hardware level, and may thus never be represented in an image basis interpretable to a human user; data may still be used to classify objects in the scene to report their presence and location |

Example 1.A

Beam-Forming with Metamaterials

Research into metamaterials as antenna components has been underway in the community for nearly a decade. As first conceived, metamaterials were seen as structured scattering objects that could provide tailored response to incident electromagnetic waves. That is, metamaterial elements could be considered as analogs to the atoms and molecules that form conventional materials. By structuring such metamaterial elements into arrays, artificial media can be fashioned with properties beyond those in nature. Because the properties of metamaterials depend on geometry rather than on fundamental, inherent processes, metamaterial designs gain access to optical properties not found in nature, and can be scaled across the entire electromagnetic spectrum simply by changing the dimensions of the element designs. Initially, most metamaterial research focused on suspending metamaterial elements in the path of freely propagating electromagnetic waves. However, during the years of research that ensued after the initial microwave demonstrations of metamaterials, a much wider range of metamaterial geometries was pursued, including transmission line and guided wave metamaterials.

Guided wave metamaterials can be added to many otherwise conventional transmission line and parallel plate waveguide devices by patterning one or both of the bounding conductors. The simple addition of this surface patterning yields extraordinary control over the electromagnetic behavior of the waveguide. Although it is possible to insert free-space type metamaterials into waveguide structures, this approach is more technically complicated from a fabrication standpoint and offers little electromagnetic advantage. A more natural approach is to pattern the "complement" of metamaterial elements into the waveguide itself, removing metal to form the shape of a traditional metamaterial element, as illustrated in FIG. 3 (bottom). For waves propagating down the waveguide structure, the presence of the complementary metamaterials causes waves to behave as though they are passing through a medium whose properties are determined by the metamaterial pattern. In this way, propagation of waves can be uniquely controlled.

In addition to controlling the behavior of waves propagating within the guided wave structure, complementary metamaterials have the important property that they radiate out of the guided wave structure into free space, and are thus a natural means of forming an antenna. In many applications, the frequency dispersion possessed by naturally resonant metamaterial elements presents an undesired obstacle. However, the highly dispersive nature of resonant metamaterial elements can actually be leveraged in clever ways in the context of antenna technology. To form a fixed aperture imaging device, an array of metamaterial elements with distributed resonant frequencies can be used to encode spatial information into the frequency domain, from which image reconstruction can occur as the result of a single frequency scan. This approach has the significant advantage of eliminating the need for bulky mechanical scanning components or expensive phase-control elements.

Additionally, the sensitivity of the metamaterial resonance can be exploited to enable dynamic tuning through relatively slight modification of the dielectric environment around the metamaterial element. A robust, low-cost, easily manufacturable approach to dynamic tuning has been pioneered by our team (Intellectual Ventures), in which a voltage-controlled change in the director (optical axis) of a liquid crystal serves as the mechanism for shifting the resonance of a metamaterial element. Experiments suggest that large numbers (1,000 s) of complementary metamaterial elements can be independently addressed and tuned using existing low-cost (LCD) technology. This technique allows reconfiguration of the metaImager aperture, and thus reconfiguration of the beam, giving access to hyperspectral and adaptive modes of imaging. As part of our project, we will fully develop modes of imaging based on both fixed and dynamic aperture approaches, as well as hybrid approaches combining frequency diversity with dynamic reconfigurability of the aperture.

A depiction of the waveguide structure is shown in FIG. 4, illustrating the patterning of the metamaterial elements into the upper conductor of either a two-dimensional (FIG. 4, top) or a one-dimensional (FIG. 4, bottom) guided wave geometry. These structures can be fed from standard 50 Ohm coaxial or rigid waveguide, and will act as antennas with aperture largely defined by the area of metamaterial patterning. The operation of the metamaterial can be understood by first considering a 1D example, illustrated in FIG. 5. When the guided wave structure is fed by a source with a given frequency $\omega_n$, it propagates along the guide as a damped plane wave with field amplitude described by $E(x,t)=E_0 \exp[i(n_{wg}x\omega_n/c-\omega t)-\gamma x]$. The propagating guided wave thus feeds each metamaterial element, which in turn—to a first approximation—radiates as a point dipole into the space above the antenna.

Thus, the far-field radiation pattern can be described in a manner reminiscent to that used for phased arrays, or $$E_n^{far}(\theta, \omega_n) = \frac{e^{ikr}}{r}\left[\sum_{p=1}^{P} A_p(\omega_n)e^{i\frac{\omega_n}{c}x_p\sin\theta} e^{in_{wg}\frac{\omega_n}{c}x_p}\right] \quad (1)$$

In this equation, the far-field single element radiation pattern is multiplied by the analog of an array factor, consisting of the sum of the complex amplitudes for each of the radiating sources at frequency. Here we have ignored polarization, but both polarizations of the wave can be managed in the metaImager design, allowing polarimetric imaging schemes. The array factor in brackets in Eq. 1 can be seen to be a sum over the product of the coupling amplitude of the $p^{th}$ resonator $A_p(\omega)$, the geometrical path length factor, and the phase of the guided wave at the position of the $p^{th}$ resonator. The complementary metamaterial elements have resonances that can be described approximately by a Lorentzian factor of the form, $$A_p(\omega) = \frac{F}{\sqrt{(\omega^2 - \omega_r^2)^2 + \Gamma^2\omega^2}} \quad (2)$$

where F is a coupling strength and $\omega_r$ and $\Gamma$ are the resonant frequency and damping factor, respectively. For the purposes of comparison, the equivalent far-field from a conventional phased array is $$E_n^{far}(\theta) = \frac{e^{ikr}}{r}\left[\sum_{p=1}^{P} A_p e^{i\frac{\omega_n}{c}x_p\sin\theta} e^{i\varphi_p}\right] \quad (3)$$

Notice that in a phased-array system, the far-field is manipulated only through the phase of each radiator $\phi_p$. This phase-factor of each element is usually controlled through an independent source and independent phase shifter, raising the system cost significantly. In addition, phased arrays are typically narrowband systems due to the requirements of spatial diversity and the general complexity of the feed networks. The inherent characteristics of phased array systems are not suitable for schemes wherein the element phase is controlled through frequency diversity. These key differences make the metaImager a far more versatile system, giving control over nearly all the terms in the governing radiative equations.

The description of the metaImager with simple models such as that expressed in Eq. 1 allows imaging scenarios to be analyzed analytically and numerically with great efficiency. We can thus readily explore the strengths and weaknesses of various compressive imaging schemes and algorithms, rapidly gaining understanding of the essentials. This exploration can be done in parallel or even be integrated with the hardware design development. Here we demonstrate the power of numerically-driven design exploration, as well as to detail operation. The approach of leveraging the natural metamaterial dispersion is most easily explained in the simple case of a 1D microstrip line (such as in FIG. 4). We consider in FIG. 5 the solution to Eq. 1 for a waveguide with a repeated, linear ramp (i.e., "saw-tooth" profile) in the element resonance frequencies.

Using the simple pattern of resonant metamaterials in the 1D system described above, we achieve a well-defined beam (in θ) with control over the direction of the beam introduced by frequency scan. The operation of this 1D saw-tooth system is reminiscent of a Frequency Scanned Array radar system. However, metamaterial elements grant detailed control over the array factor, which Frequency Scanned Array systems do not. Additionally, the use of resonant metamaterial elements gives increased coupling efficiency for a fixed aperture.

Figure 6:
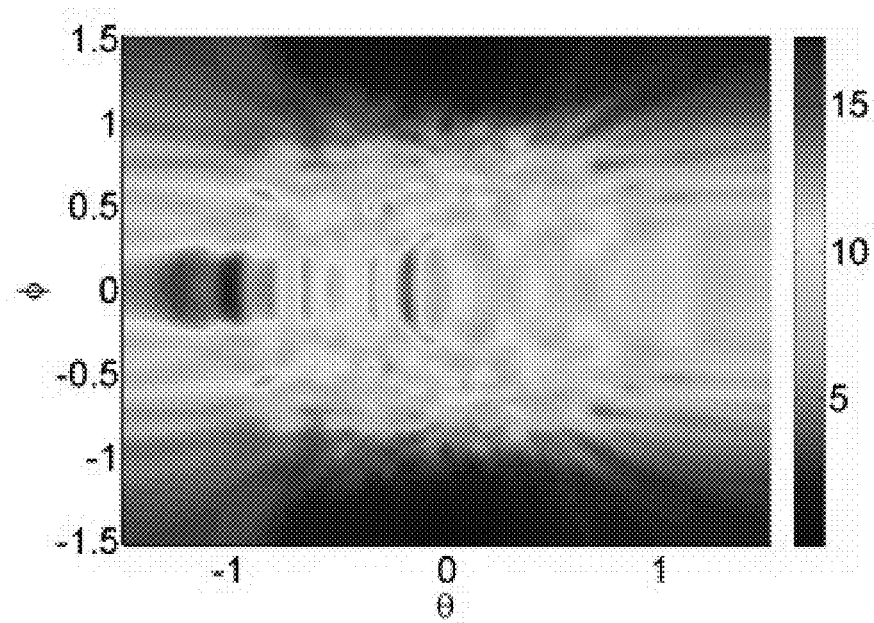
FIG. 6 is the far-field for a square metaImager panel designed to maximize sampling diversity. It is the power spectral density (integrated across operation bandwidth) as a function of azimuthal and elevation angles.
Figure 7:
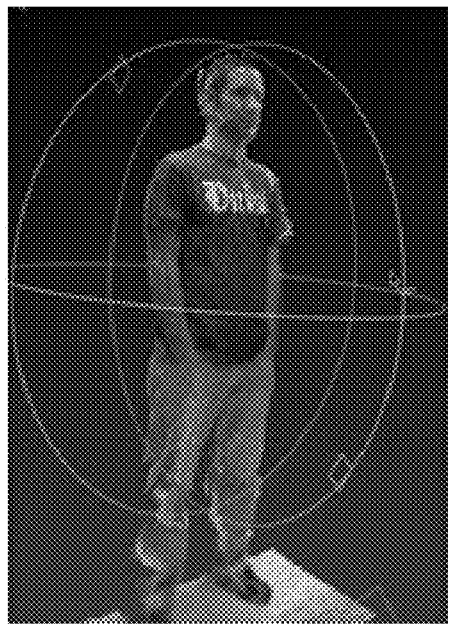
FIG. 7 is a 3D model of a subject capture in real time using structured light sensor (Primesense sensor).

While the 1D case serves to demonstrate operation principles, the near-linear mapping between beam angle and frequency is not well-suited for compressive imaging schemes. To show a maximally diverse sampling scenario, we consider a random-resonator configuration in FIG. 6. Also, to prove the power of this simple model for design, we escalate to a 2D square (30 cm2) metaImager panel operating at X-band. Such a metaImager panel contains 20,000 elements, and yet our model-based approach allows us to design such panels quickly, taking minutes rather than days (FDTD, FE methods) for each configuration.

The results of this 2D metaImager panel are quite promising for compressive imaging, especially for a first-generation unoptimized transceiver. Looking at the left frame of FIG. 6, the frequency integrated Power Spectral Density shows a beam which covers full ±90 degrees of view in azimuth, and nearly ±45 degrees in elevation. In the dispersive-imaging mode of operation, the spatial-information contained in this region (the scene) is remapped to the frequency basis.

Example 1A.1

Transceiver Design/Optimization

The use of metamaterial elements in the transceiver panel gives access to a vast design space in terms of beam-configuration. We have now the opportunity to mate the antenna aspects of the metaImager to specific imaging algorithms and processing hardware, all co-optimized as a system to maximize various implementations and scenes. Additionally, the various modes of operation (e.g., reconfigurable, hyper-spectral, frequency-diverse, hybrid) preferentially benefit from different beam transceiver panel configurations. Within any given design space, many choices in transceiver panel layout may be seemingly commensurate. In such cases, comparison using algorithm-appropriate metrics such as Singular Value Decomposition, combined with design iteration methods such as genetic algorithms, can be used to find a globally optimized design. Important attributes of the metaImager panel and its environment to be considered include: metamaterial element oscillator strength, element coupling, and quality-factor; scene sparsity and depth; and beam basis-set choice. The metamaterial element oscillator strength, element coupling, and quality-factor must be considered in relation to the available bandwidth and aperture. Ratios of these core attributes are primary governing factors in the available space-bandwidth product—a key metric for imaging devices. Scene sparsity and depth are important, as compressive imaging as a comprehensive technique spans a wide variety of hardware and algorithmic approaches. The composition of the scene to be interrogated has important implications on the appropriate compressive imaging analysis techniques and the required number and sparsity of data collection. These in turn, have implications on the desired configuration of the metaImager transceiver panel. Beam basis-set choice affects the layout of the metaImager transceiver configuration and can result in beam-configurations spanning a range of sampling diversity. Many of these configurations may be redundant, especially when relying on random/pseudo-random configurations. Although minor degeneracy within the basis is to be expected when sampling diversity is maximized, excessive degeneracy can negatively affect signal-to-noise, and thus imaging speed, wasting computational power.

Example 1.B

Integration of EO/IR Sensing and GPU Processing

The planar geometry of the metaImager allows straightforward integration of electro-optical (EO)/infrared (IR) sensing in a flat panel form factor. (EO detectors allow imaging at visible wavelengths.) This multispectral approach yields several advantages, the most important being improved resistance to simple countermeasures because of the dramatically increased difficulty of obtaining materials that are either transparent to mmW and EO/IR, or that exhibit low contrast compared to clothing or human skin. Additionally, the EO/IR image allows the validation of the compressively sensed mmW image to ensure realistic capture of the subject geometry. In the diffraction limit, the µm-scale wavelengths of the EO/IR sensor support higher range and angular resolution than an mmW sensor. Surfaces inferred from the EO/IR image can be used to define the boundary conditions for the Green's functions used to solve for the electromagnetic properties of materials in a given scene.

Figure 5:
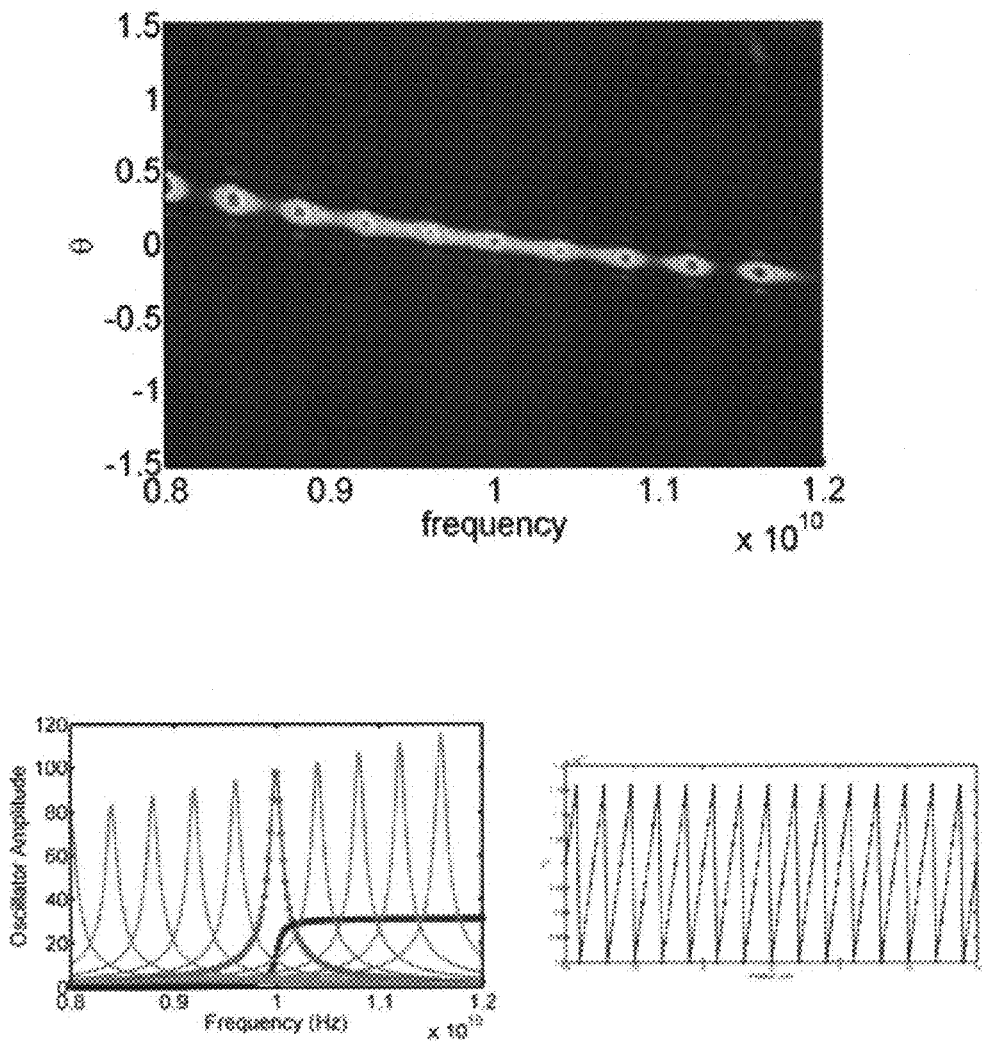
FIG. 5 depicts the design and far-field distribution for a one dimensional microstrip metaImager with periodic array-factor: $A_j(\omega)$. Top left is the dispersion design of 10 frequency-distinct metamaterial resonator elements. Bottom left is the periodic "saw-tooth" layout of resonators along the microstrip. Right is the far-field angular distribution, as a function of frequency. Units are in Radians, with steering shown over roughly 40°.

Initial results in capturing subject geometry with simple, low-cost structured light EO/IR sensors, such as the Primesense sensor show the feasibility of capturing 3D subject pose information in real time, as shown in FIG. 5. These sensors are rapidly becoming commoditized due to their use in gaming applications (e.g. Microsoft Kinect). At the same time, GPU processing is becoming mainstream and extremely high performance multicore GPUs are available at low cost. For example, the NVIDIA Fermi series GPU used to process the 3D subject poses shown includes 352 CUDA cores operating at 1.2 GHz at a cost well below $100.

The ability to decompose a scene in real time from a combination of EO/IR and mmW data is a necessary capability for imaging in unconstrained complex scenes, such as mass transit and building security applications. In these applications it is infeasible to install traditional portal-based mmW imagers that require subjects to stop and assume a fixed pose while imaging is conducted with a mechanically scanned sensor array. The fully electronic image acquisition of the metaImager is complemented by the image quality and high frame rates available from the EO/IR sensor.

Example 1.C

Reduced System Acquisition and Operation Costs

In addition to the potential imaging performance improvements enabled by the metaImager technology, it is expected the metaImager will yield a much lower acquisition and maintenance cost than today's mechanically scanned mmW transceiver arrays. The transition from a mechanically scanned array of multiple transceivers to a fully electronic metaImager eliminates the size, weight, and high cost of mechanical assemblies as well as reducing failure modes due to dust and vibration that will eventually plague any mechanical system in a harsh environment such as a mass transit platform. The metaImager array can be sealed within a dust and moisture proof enclosure that requires no maintenance.

The planar geometry of the metaImager leverages well established printed circuit technology with the addition of techniques borrowed from the high volume display fabrication industry. This permits the manufacture of metaImager components and subassemblies using fully commoditized manufacturing processes. The single RF transceiver required for each metaImager has the potential to reduce the cost of RF/mmW testing by an order of magnitude over existing multiple-transceiver approaches.

Example 1.D

SNR of Single Mode Measurement Systems

In the proposed imaging modality, the metaImager—being based on a single detector—measures one mode at a time. Assuming the integration time per mode is limited to be 1/N that of a system that measures N modes simultaneously, the signal-to-noise ratio (SNR) would appear to be $\sqrt{N}$ times worse than that of the parallel measurement system—if the noise in the measurement is proportional to the integration time (SNR is defined as total signal energy divided by the standard deviation of the noise). The metaImager operates as a single mode detector, but may still be advantageous relative to a traditional imager from an SNR perspective for two reasons. The first reason is that since only one detector is used, it is worthwhile to invest in an extremely low noise detector. If hundreds or potentially even thousands of modes are to be sensed, the nominal cost increase due to a higher quality detector explodes into a monumental cost increase for the overall system of a parallel measurement system. The second reason that the SNR of this single mode system is not a drawback is that the system is potentially dynamic in the selection of the modes being sampled. For example, if the scene is dynamic and continuously being estimated with every projection, the dynamic mode selection capabilities would allow for more energy to be focused on the areas of interest in the scene. This means that in the extreme case that a single mode is of interest, the entire sampling period can be dedicated to sampling that mode, which flips the direction of the square root advantage in favor of the single mode imager.

Example 1.E

Experimental Progress

Figures 8A, 8B:
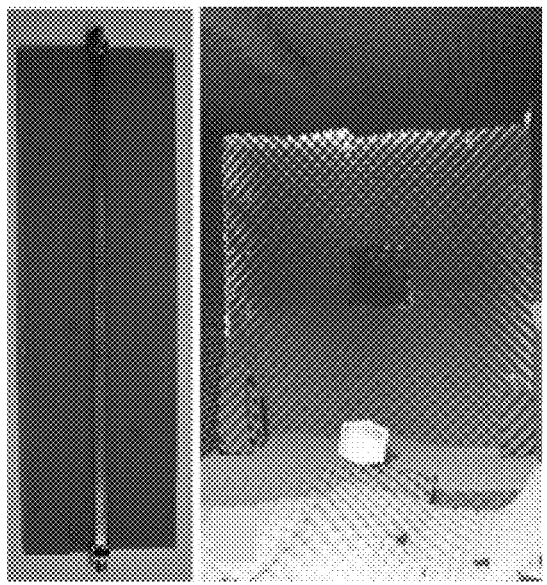
FIG. 8A is a 1D metaImager array.
FIG. 8B is an experimental scene of a single sub-diffraction limit scatterer.

Work to date on metaImaging systems has focused on 1D (variation only along a single angular dimension) and 1+1D (variation along one angular dimension and one range dimension) implementations at X-band frequencies. Both imaging modes use the same microstrip transmission line metaAntenna shown in FIG. 8A, but use different data acquisition and computational approaches. In the 1D case only the amplitude of the returned signal is recorded and only scenes with angular variation can be reconstructed.

Figure 9:
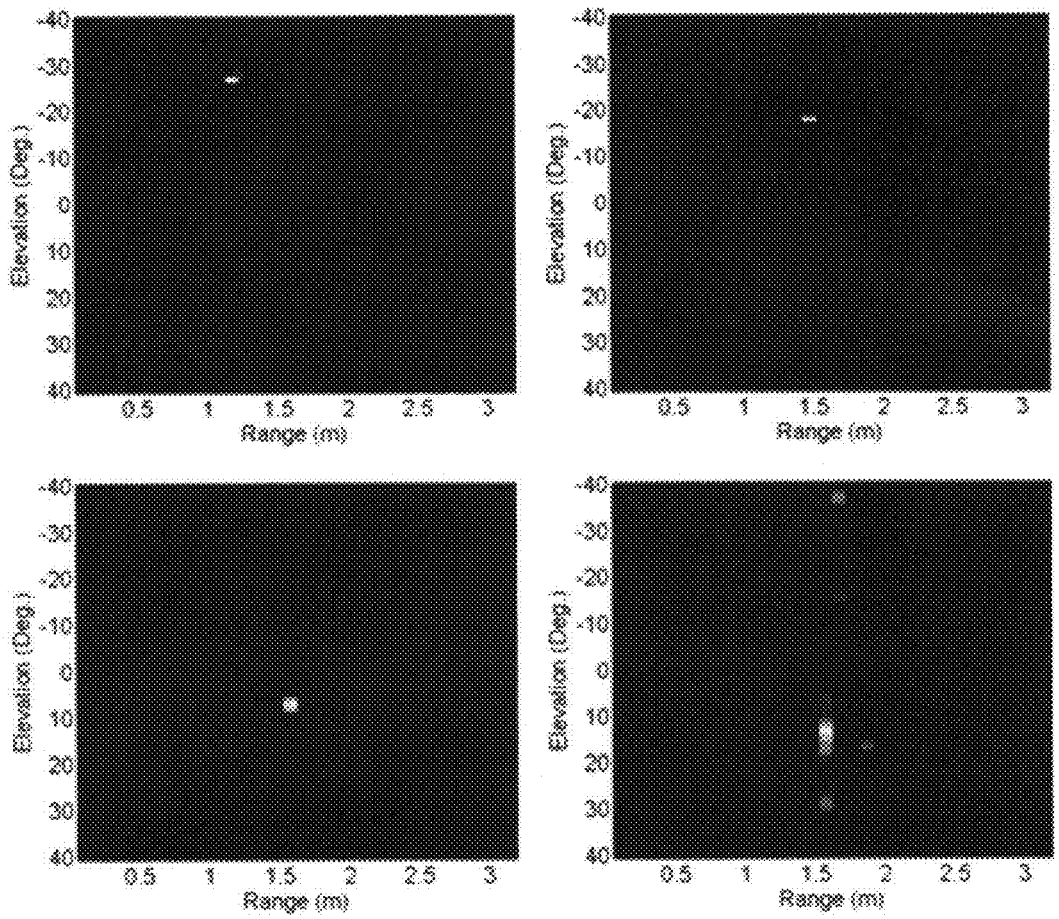
FIG. 9 is four 1+1D (angle and range) metaImager images of four different scenes, each consisting of a single sub-diffraction limit scatterer. The true location of the scatterer is marked by the red circle.
Figure 10:
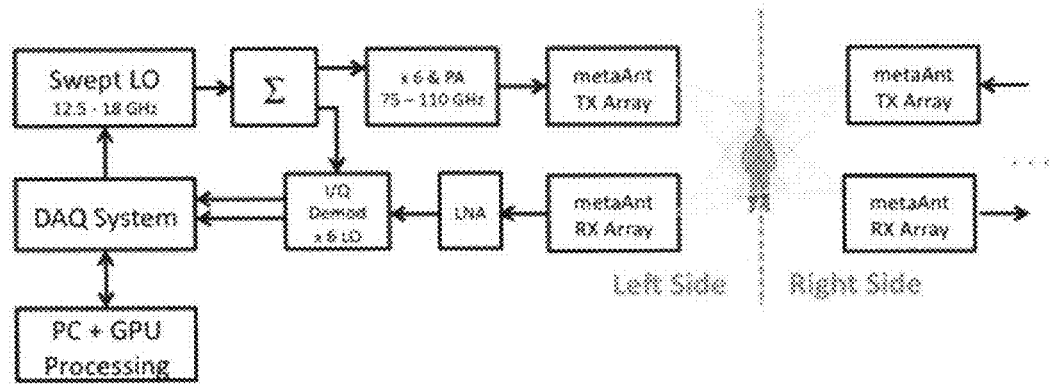
FIG. 10 is a block diagram of the RF transceiver subsystem proposed for the metaImager.
Figure 11:
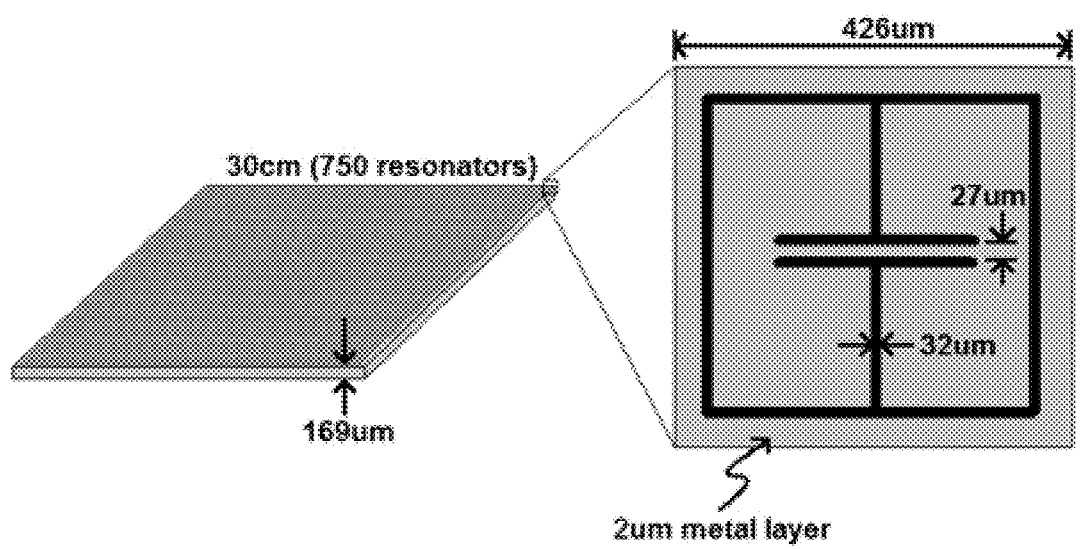
FIG. 11 depicts the unit cell and overall size of the prototype metaImager under development.

In the 1+1D case, phase information is also recorded and scenes with variations in angle and range can be reconstructed. Since each frequency only carries one spatial sampling mode, the measured data is highly compressed. If we knew exactly the distance at which the scene was to be imaged, we would have a full set of spatial modes and could perfectly reconstruct the angular image to the diffraction limit, or if we knew exactly at which angle an object was present we could locate its range to the accuracy of a short pulse of equivalent bandwidth. Knowing the scene is sparse in some basis allows a tradeoff between these conflicting interests. We have succeeded in reconstructing 1+1D scenes (angle and range) of points at various angles and ranges of the type shown in FIG. 8B. Reconstructed images are shown in FIG. 9.

Example 1.F

Technical Innovation

In one embodiment, as a demonstration of scalability, resonator designs scaled to 100 GHz will have a unit cell size of on the order of 500 um, with minimum features about 25 um or 1 mil. These expected fabrication constraints for 100 GHz MetaImagers are compatable with existing fabrication techniques and commercial vendors. For example the vendor MicroConnex, can achieve 25 um trace-and-space over 30×30 cm on a wide range of substrates with lithographic techniques. Materials requirements are also easily met at these frequencies, copper conductors and polyimide substrates are typical compatable choices.

In another embodiment silicon and polysilicon substrates are used to form a MetaImager operable through 100 GHz. The compatability of many standard CMOS processes can allow integration of active areas into the elements scattering elements. This can be used to form dynamic apertures. Regions of silicon and polysilicon can easily be modified using chemical or electronic doping, affecting the scattering element response. It has been demonstrated by the inventors that such active-metamaterial techniques are applicable at relevant mmW frequencies.

Example 1.G

Metamaterial Apertures for Computational Imaging

Abstract:

We illustrate the use of metamaterials to from an aperture that can be configured for optimal compressive imaging of scene data. This flexible, designer aperture allows image compression to be performed on the physical hardware layer rather than in post-processing—avoiding the detector, storage, and transmission costs associated with full diffraction-limited sampling of a scene. To demonstrate the approach, we use a guided wave metamaterial aperture to perform fast, compressive imaging of two-dimensional sparse still and video scenes at K-band (18-26 GHz) frequencies, using frequency diversity to avoid mechanical scanning Image acquisition is accomplished with a 40:1 compression ratio.

Background:

Imaging systems can be characterized by object dimension (e.g., 2D for photographs) and information dimension (e.g., the number of pixels in an image). Conventional imaging systems are built around the assumption that the object dimension must be conserved in the information dimension, regardless of the inherent information content of the scene. Compressive measurement leverages the realization that measurements need not conserve form of dimension in this sense (1-3). Indeed, the concept of dimension assumes that measurements are well-ordered in some space. This ordering implies that adjacent measurements sample similar object data. Information transfer efficiency, however, would be maximized if object data measured by successive measurements were as distinct as possible.

Figures 12A, 12B, 12C:
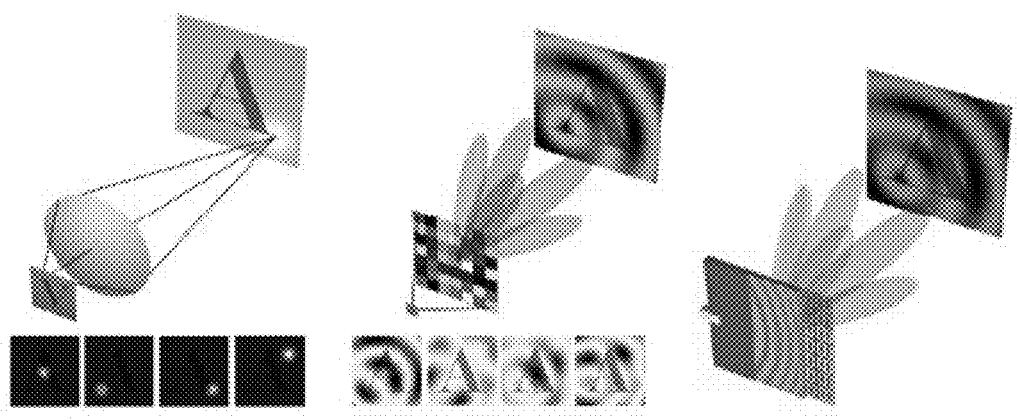
FIGS. 12A, 12B, and 12C are diagrams showing comparisons of conventional and compressive imaging schemes in accordance with an embodiment of the present disclosure. This is a comparison of (FIG. 12A) conventional and (FIGS. 12B, 12C) compressive imaging schemes. A conventional image uses a lens to form measurement modes that effectively map all parts of an object to a detector/image plane. Each mode may contribute highly specific and localized information, and all modes can be captured simultaneously using a pixel array or other detector. Within single pixel schemes, many types of modes can be used to form the image, with measurements being captured sequentially. In the example shown in FIG. 12B, a random (in both phase and amplitude) mask can be used to project modes into the far-field that sample the entire scene. The mask depicted serves simultaneously as a holographic optic that focuses light to a single pixel detector. The microwave metamaterial imager reported here FIG. 12C makes use of a planar waveguide that feeds a holographic array of ELCs. The waveguide acts as a single pixel device, with the array of ELCs serving to produce the illuminating spatial modes.

At the diffraction limit, the finite size of the aperture used to form an image imposes a minimum pixel dimension N(4), which equates to the number of measurement modes needed to exactly reproduce an arbitrary scene. This dimension is known as the space-bandwidth product (SBP) (5). In a conventional imaging system, the measurement modes might be thought of as diffraction-limited spots that sample all parts of the scene (FIG. 12A). Because these modes have little or no spatial overlap in the detector plane, they can be acquired nearly independently and simultaneously with N detectors, such as a charge-coupled device (CCD) array. Note, however, that for a typical scene, many of the modes provide little to no useful data; for this reason, natural images can be substantially compressed without excessive loss of image fidelity. Virtually all electronic images are now compressed using algorithms such as JPEG, and the property that most scenes contain redundant information lies at the heart of compressive sampling.

The concept of measurement mode can be generalized, such that the imaging process can be expressed mathematically by the relation g=Hf, where g is a collection of measurements, H is the measurement matrix (a row-wise array of all measurement modes), and f is the sampled scene. To form a completely determined dataset of measurements (thus enabling a unique solution for f), the rank of H must equal the scene's SBP (6). Compressive sampling allows reconstruction of underdetermined scenes, finding f using the minimization problem arg min, $\|g-Hf\|_2^2 + \lambda R(f)$, where R(f) expresses some prior knowledge about the likely composition of the scene. Typically in compressive sampling, R is the $l_1$-norm, which reflects the inherent sparsity that exists in natural scenes. This nonlinear minimization problem is rigoursly solvable even with highly under-determined measurement datasets (7-9).

Imaging systems for radio frequency and millimeter-wave electromagnetics have genereally been of two types: single pixel chain systems, and multi-element phased-arrays (or synthetically phased arrays). The measurement modes used by classical single pixel systems are typically inefficient at collecting imaging data. A rasterizing scanned bean, for instance, collects information about only one point in space at a time (see supporting online information, section S7, provided herein in Example 1.H below). Multi-element phased array systems have much more flexibility in the measurement modes they can access, but sacrifice the size, weight, power, and price advantages that make single-pixel systems so attractive.

Results:

We show that metamaterial apertures have unique advantages for compressive imaging because they can be engineered to support custom-designed measurement modes. Leveraging the same electromagnetic flexibility that metamaterials have shown in many other contexts (10-15), we can construct an imaging aperture suitable for single or multi-pixel operation that can project nearly arbitrary measurement modes into the far-field, constrained only by the size of the aperture and resonant elements. The underlying concept of a compressive imager is illustrated in FIG. 12B, which shows a hologram (which might be formed from metamaterials) being used to project a distributed mode onto the scene. In this scheme, a single pixel detects the single ($i^{th}$) measurement, which is evaluated as $$g_i = \sum_f H_{if} f_f$$

One of the pioneering implementations of this form of compressive imaging was done at optical frequencies in 2006 by Waking et al. (16). In 2008, Chan et al. demonstrated a similar approach at terahertz using a series of random static (17) and dynamic (18) spatial modulating masks. Other groups have presented additional ways to introduce mode diversity (19).

It is at this point that the physical implementation of a compressive imaging scheme meets the algorithmic implementation, as the measurement modes must be sculpted to obtain system performance. We illustrate the approach here using a one-dimensional metamaterial aperture, and use it to perform compressed imaging of various two-dimensional (one-angle plus range) canonically-sparse scenes. While almost all scenes are spares in some basis, canonically sparse scenes are also commonplace. Ine example is the detection and location of small amounts of metal in a metal-free environment, such as might be relevant for security screening applications. Our imaging device consists of a leaky waveguide, formed by patterning the top conductor of a standard microstrip line with complementary electric-LC (cELC) (20, 21) metamaterial elements (see FIG. 13A). This is equivalent to the schematic representation of the compressive image in FIG. 12C except that the aperture becomes inedimensional. Each cELC acts as a resonant element that couples energy from the waveguide mode to free space. The center frequency and spectral shape of the cELC control the amplitude and phase of the transmitted wave, such that the far-field modes can be designed by modifying the geometry of the cELCs along the microstrip (see supporting online material in Example 1.H below). A finite-element, full-wave solver (Microwave Studio, CST) is used for the detailed design and characterization of the radiation from the cELCs. By controlling the design and distribution of the individual elements, nearly any desired aperture mode can be created.

For canonically spare scenes, an efficient set of measurement modes are those that distribute energy randomly across both the amplitude and phase space of the scene (see FIG. 12B). This randomness is expressed with respect to some mode-indexing parameter. The dispersion present in resonant metamaterial elements makes frequency a natural choice for the mode-indexing parameter, creating a mapping between the measurement modes and frequency. Thus, by sweeping the frequency of the illuminating signal across the available bandwidth, we access the aperture modes sequentially. Essential to image reconstruction using arbitrary set of measurement modes is that the modes be as orthogonal as possible each other, which places demands on the sharpness and separation of the resonances (see supporting online material in Example 1.H, sections S3 and S4).

Figure 13A:
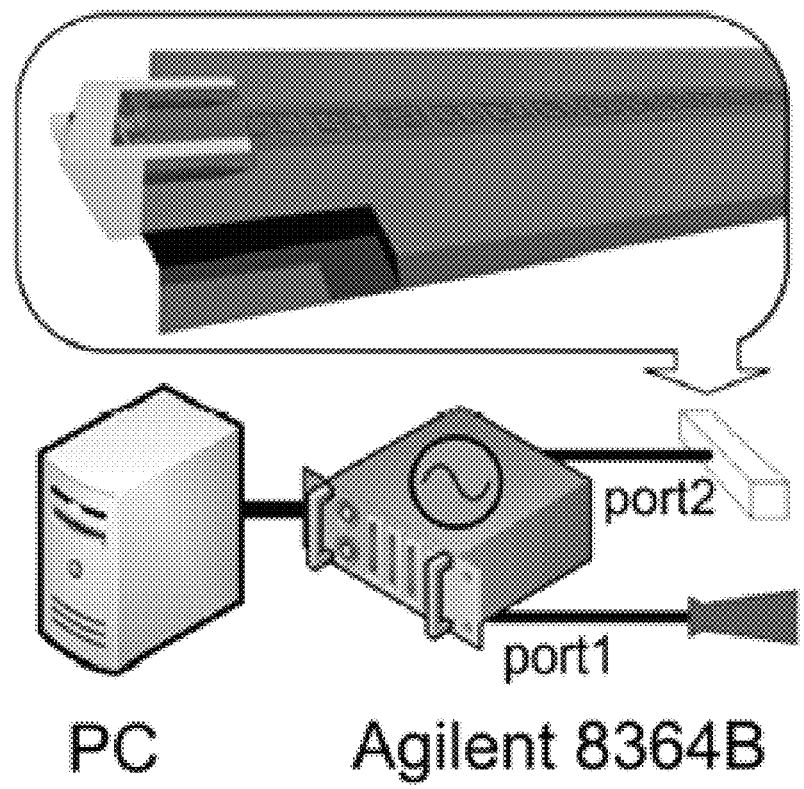
FIG. 13A is a schematic of an experimental setup according to an embodiment of the present disclosure.
Figure 13B:
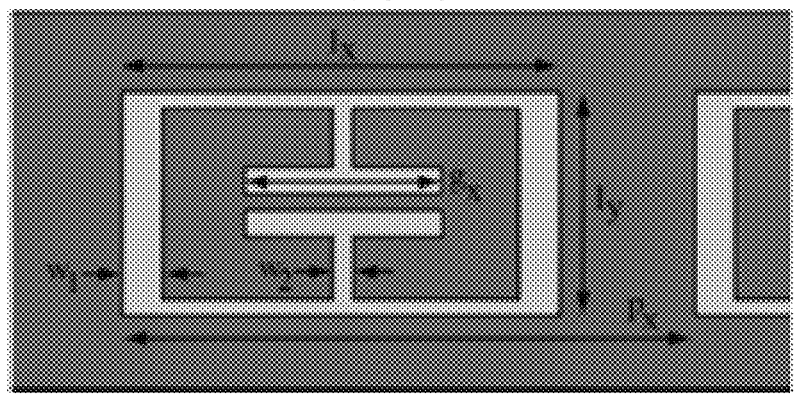
FIG. 13B is a diagram showing dimensions of unit-cells of an experimental setup according to the present disclosure.
Figure 14A:
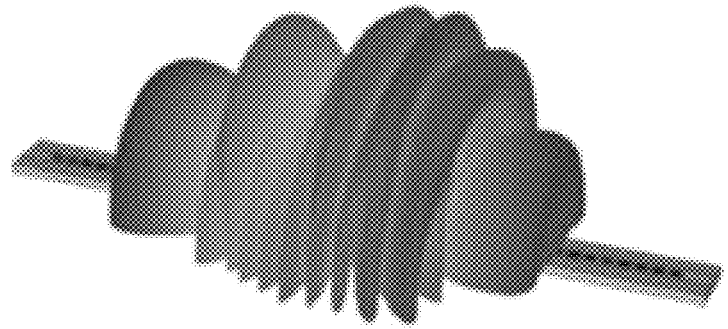
FIGS. 14A, 14B, and 14C are diagrams showing the use of resonant metamaterial apertures to create frequency-agile mode distributions in accordance with an embodiment of the present disclosure. Using resonant metamaterial apertures to create frequency-agile mode distributions. Far-field electric-field profiles for a metaImager strip at two frequencies, 18.5 GHz (FIG. 14A) and 21.8 GHz (FIG. 14B), from simulation.
Figure 14B:
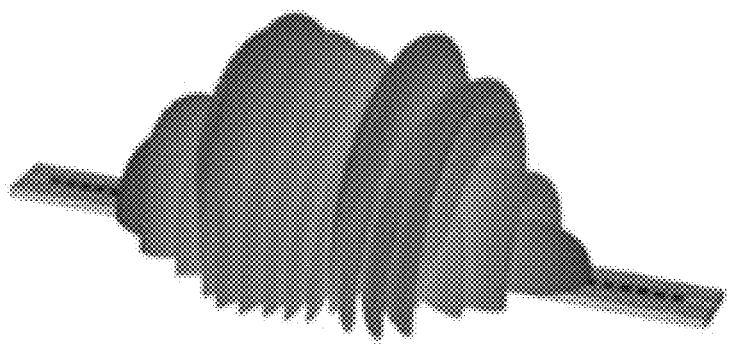
Figure 14C:
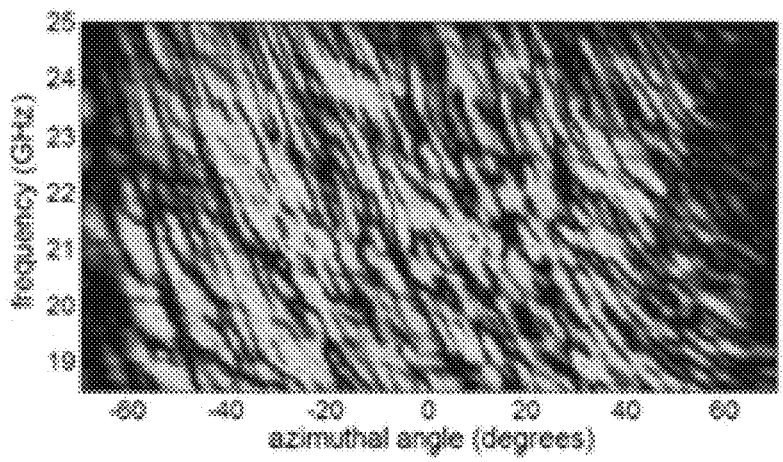

We have fabricated such a random-mode aperture, 16" in length, designed to operate in the K-band from 18.5-25 GHz. Two samples of the measurement modes for this design are plotted in FIGS. 14A and B, and the complete measurement matrix is plotted in FIG. 14C. The metamaterial aperture can be used as a source of illumination, as a receiver, or sued simultaneously for both functions as a transceiver. Each configuration has advantages and disadvantages for different scenarios; for the demonstration presented here, we elect to use the metamaterial antenna as a receiver. In this configuration, scenes are illuminated by far-field radiation from a single source—a low-directivity horn antenna. Backscattered radiation from objects in the scene floods the metamaterial aperture, which selectively admits only one specific mode at each measured frequency. The resulting (complex) signal is measured using an Agilent 8365B vector network analyzer, as shown in FIG. 13A.

To test the imaging capabilities of the metamaterial aperture, we formed several simple sparse scenes inside a 4 m×4 m×3 m anechoic chamber. Each scene contained two or three scattering objects (retroreflectors), 10 cm in diameter, located at arbitrary positions in the chamber. FIG. 15B shows four such scenes, with each scene plotted in a color (red, green, blue and black). The color saturation represents the reconstructed scene scattering density at K-band, and the actual locations of the objects are given by solid color "+"s. All scenes were reconstructed using the TwIST code (22) (see supporting online material in Example 1.H below).

For an aperture of this size and bandwidth, the diffraction-limited angular resolution is 1.7° and the bandwidth—limited range resolution is 4.6 cm/Across a field of view of ±70° in angle and 1.5-4 m in range, this gives a SBP of 4482. Our measurement however, contains only 101 values—representing a compression ratio of more than 40:1. Putting this in perspective, a raster scanned beam imager also making 101 randomly chosen measurements would successfully image each of these scenes only 2.3% of the time (see supporting online material in Example 1.H below).

Figure 15:
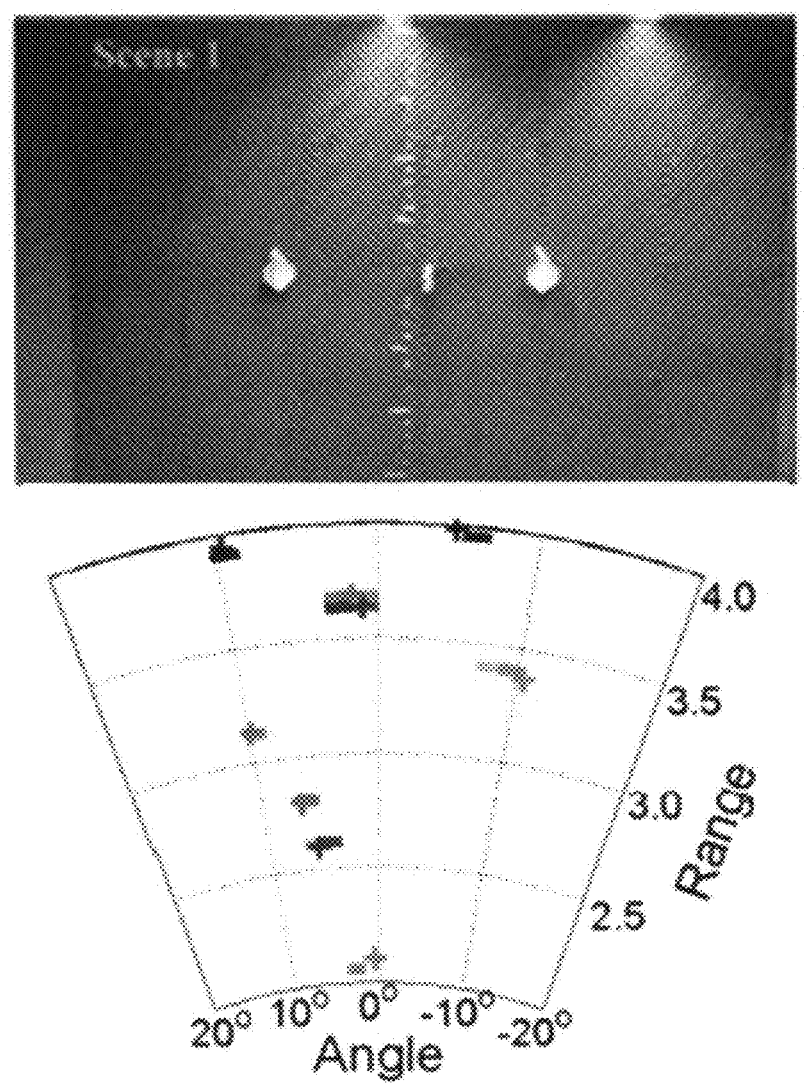
FIG. 15 is a diagram showing four scenes according to an embodiment of the present disclosure where each consisting of two 10 cm scattering objects. The solid "+" shows the actual location of objects, and the pixels shows the reconstructed image after. Pixel size reflects the maximum instrument resolution, given by the space-bandwidth product. The image has been cropped from the full field of view of ±70° in angle and 1.5-4 m in range.

We note that the acquisition of a complete dataset for the scenes in FIG. 15 requires only 100 milliseconds, which makes imaging moving scenes a tantalizing possibility. From a compressive-imaging viewpoint, brute-force frame-by-frame reconstruction is an inefficient way to reconstruct sequential scenes. In the same way that prior information about the sparsity of single scenes helps to reconstruct an image with 97% missing information (40:1 compression), knowledge about the continuity of scenes frame-by-frame means video is most appropriately reconstructed in a spatio-temporal basis.

Figure 16:
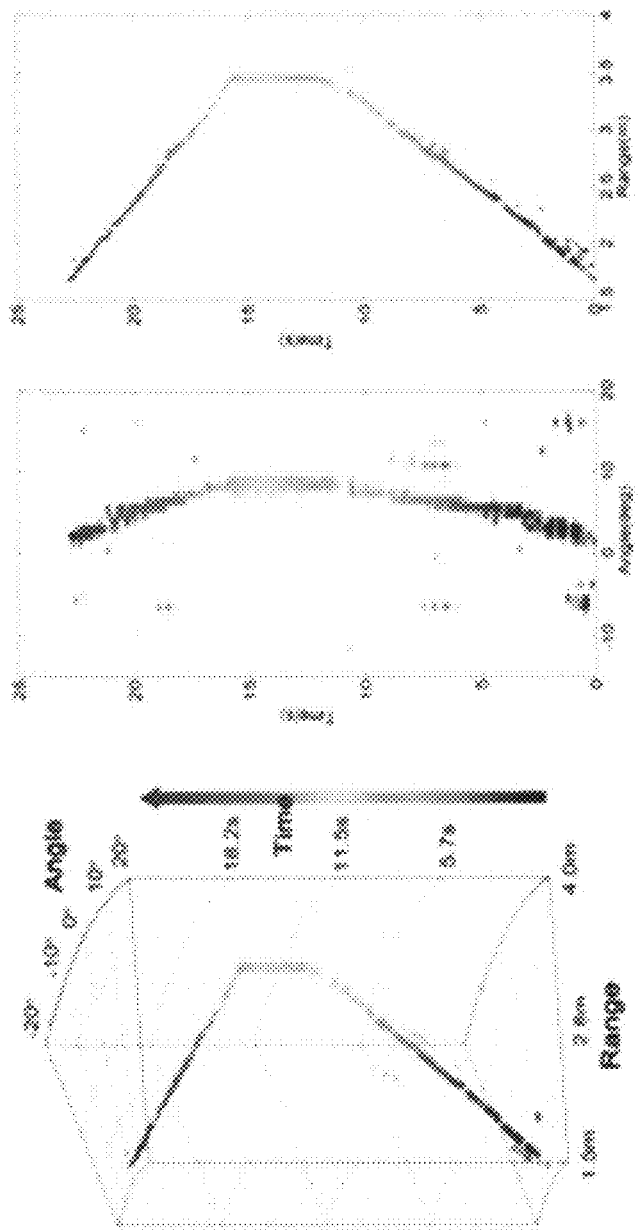
FIG. 16 is an image showing the video-rate tracking of a single object through the scene showing angle-range-time in accordance with an embodiment of the present disclosure. Each voxel is sized to match the spatio-temporal resolution of the metaImager in time, from blue to red. On the right are 2D orthographic projections of the data showing angle versus time and range versus time.

To demonstrate imaging of moving scenes, we perform repeated 100 mS sweeps while moving an object through the scene. During reconstruction, we leverage the known interframe continuity of scenes to aid in selecting a regularization parameter for our compressive reconstructions. Using this technique we image and track a single scattering object moving though the scene on a linear path at ~0.2 m/s. FIG. 16 shows this reconstruction. The plot shows the obtech position in angle and range, mapeed as a function of time, and depicts the retrieved object scattering density via the transparency of each plotted voxel. The voxels are sized to accurately represent our spatio-temporal resolution. To make the complicated dataspace more visually accessible, voxels are also color coded in time from blue to red. This data is presented in traditional video format (xH264 encoded MPEG4)—along with a web-cam recording of the object motion—in the supporting online material in Example 1.H, section S1 below).

The acquisition speed in this experiment is limited primarily by the network analyzer, which is designed for operational flexibility in precisely characterizing arbitrary linear networks, rather than for high dynamic range or sweep speed.

The aperture we have presented here enable a static, through custom, set measurement modes. Incorporation dynamic tuning (23) of the metamaterial elements could enable reconfigurable measurement modes, for which the full set of available aperture modes could be extended to form an over-determined solution for any scene. This allows down-selection to a subset of modes best suited to the current imaging task. One obvious path towards realizing such a dynamic-aperture system is to leverage existing techniques for tuning the response of metamaterials (24-26), thus adding additional control parameters—such as electrical voltage—to index the measurement modes. Dynamic tuning also frees the aperture to work either synergistically with or independently from a frequency bandwidth—effectively enabling hyperspectral imaging. Hyperspectral imaging can mitigate potential issues arising from imaging dispersive materials, may allow material identification in some cases, and helps to improve overall image reconstruction quality (27).

Discussion:

To recap, the imaging system we have presented combines a computational imaging approach with custom aperture hardware that allows compression to be performed on the physical layer used to do the illumination and/or recording.

The use of metamaterials is a convenient tool for the creation of such apertures, as metamaterial techniques offer a well-understood design path. Leveraging the resonant nature of metamaterial elements also creates frequency-diversity of the measurement modes, giving an all-electrical way to quickly swap through a mode-set without bulky and slow mechanical scanning apparatus or expensive and fragile phase-shifting elements.

Example 1.H

Online Supplemental Materials

The following material is intended to supplement Example 1.G. It provides movies of the video-rate data, derivation, and description of several relevant models, and discussion on the design of the metamaterial aperture.

S1. Video-Rate Scene Capture

Movie (H.264 MPEG-4 codec) of the video-rate scene capture.

S2. Coherent Aperture Forward Model

This section presents the derivation of a forward model is provided which describes the use of an arbitrary radiative aperture to image an arbitrary scene (existing outside the near-fields zone). Those familiar with the derivation of the radar equation may notice considerable overlap, but the importance of phase within the illumination-field requires accounting the electric-fields coherently, unlike traditional radar expressions.

Consider a system in which one aperture coherently illuminates a scene and a second aperture coherently receives light scattered by the scene. Each aperture may be coupled to a single source/detector. Let $S^{tx}(x)$ be the transfer function from the source to point x on the illuminating aperture $A^{tx}$, and let $S^{rx}(x)$ be the transfer function from the detector to point x on the receiving aperture $A^{rx}$. Then for source electric field magnitude $E_S$, the electric field across the transmitting aperture is given by, $$E^{tx}(x)S^{tx}(x)E_S \quad (S2.1)$$

For an incident electric field $E^{rx}(x)$ across the receiving antenna aperture, the electric field magnitude at the detector is $$E_d = \int_{A^{rx}} E^{rx}(x) \cdot S^{rx}(x) \quad (S2.2)$$

The field at scene-point x' generated by the transmitting aperture (with $E_x=1$) is then given by the convolution $$E(x') = \int_{A^{tx}} S^{tx}(x) G(x'-x) dx \quad (S2.3)$$

where $$G(r) = \frac{e^{-ik_0|r|}}{4\Pi|r|}$$

is the Green's function of free-space wave propagation.

Without loss of generality, only a discrete set of N points in the scene may be considered. The field at observation point $X'_n$ is denoted by $E_n$. Similarly, the transmitting aperture can be discretized by considering the aperture as a finite collection of $A^{tx}$ number of radiating elements where the radiation pattern of the radiator at aperture position $x_a$ is given by $R_{na}$. The convolution for the radiated field then becomes, $$E_n = \sum_{a=1}^{A^{tx}} S_a^{tx} G_{na} R_{na} \quad (S.4)$$

We can also discretize the receiving aperture by considering the aperture as a finite collection of $A^{rx}$ number of radiating elements where the radiation pattern of the radiator at aperture position $x_{a'}$ is given by $R_{na'}$. The integral for the detected field magnitude is then, $$E_d = \sum_{a'=1}^{A^{rx}} E_{a'} R_{na'} S_{a'}^{rx} \quad (S.5)$$

A 'scene' may be defined as a spatially varying scattering density f(x'), such that when an electric filed $E_i(x')$ is incident on a point in the scene, the scattered field magnitude at the point is $E_S(x')=f(x')E_i(x')$. When the scene is discretized, the scattering density from the scene 'patch' at point $x_n'$ becomes $f_n F_{ijn}$, where $F_{ijn}$ is the bistatic scattering pattern of the scattering to observation point x, when the patch is illuminated from point $x_j$. Discretizing the scene-field interaction in this way may be an approximation that holds when the scene discretization is fine enough that there is little variation of $E_S(x')$ over the area of patch $x_n'$.

The formulation so far may include multiple reflections within the scene, treating each $E_S(x')$ as a source which further interacts with the scene, as $E_{S2}(x'')=f(x'')E_S(x')$. However, to simplify, multi-path scattering may be ignored. Then the field scattered back to point $x_{a'}$ on the receiving aperture from point $x_n$ in the scene is given by, $$E_{a'n} = f_n F_{a'an} G_{a'n} E_n \quad (S2.6)$$

and the total field at point $x_{a'}$ from all points in the scene is, $$E_{a'n} = \sum_{n=1}^{N} E_{a'an} = \sum_{n=1}^{N} f_n G_{a'n} F_{a'an} E_n = \sum_{n=1}^{N} f_n G_{a'n} F_{a'an} \sum_{a=1}^{A^{tx}} S_a^{tx} G_{na} R_{na}$$

Then the field magnitude at the detector from all the radiators on the receiving apertures is $$E_d = \sum_{a'=1}^{A^{rx}} S_{a'}^{rx} R_{na} E_a = \sum_{a'=1}^{A^{rx}} S_{a'}^{rx} R_{na} \sum_{n=1}^{N} f_n G_{a'n} F_{a'an} \sum_{a=1}^{A^{tx}} S_a^{tx} G_{na} R_{na}$$

Reordering the Summations Gives, $$E_d = \sum_{n=1}^{N} \sum_{a'=1}^{A^{rx}} S_{a'}^{rx} R_{na} G_{a'n} \sum_{a=1}^{A^{tx}} S_a^{tx} R_{na} F_{a'an} f_n \quad (S2.9)$$

We can write this linear equation in matrix form as $$E_d = [h_1 \; h_2 \; \ldots \; h_N] \begin{bmatrix} f_1 \\ f_2 \\ \vdots \\ \vdots \\ f_N \end{bmatrix} \quad (S2.10)$$

where, $$h_n = \sum_{a'=1}^{A^{rx}} S_{a'}^{rx} R_{na'} G_{a'n} \sum_{a=1}^{A^{tx}} S_a^{tx} G_{na} R_{na} F_{a'an} \quad (S2.11)$$

Comparing $h_n$ to Eqn. S2.4, we note that the summations over the transmitting and illuminating apertures are just the fields radiated by the apertures. So, $$h_n E_n^{rx} E_n^{tx} F_{a'an} \quad (S2.12)$$

If the scene patch scattering patter, $F_{a'an}$ is a constant, F, (as it would be if the scene were composed of isotropic point scatters) or independent of $x_a$ and $x_{a'}$ so that it becomes $F_n$ (as it may be if the scene is in the far-field of the aperture), then $h_n$ can be further simplified.

$$h_n = E_n^{rx} E_n^{tx} \quad (S2.13)$$

If the scene is illuminated with M different transmit/receive aperture combinations giving M electric field amplitudes measured at the detector, then the vector of all measurements may be expressed as, $$\begin{bmatrix} E_1 \\ E_2 \\ \vdots \\ \vdots \\ E_N \end{bmatrix} = \begin{bmatrix} h_{11} & h_{12} & \cdots & h_{1N} \\ h_{21} & h_{22} & \cdots & h_{2N} \\ \cdots & \cdots & & \cdots \\ h_{M1} & & & h_{MN} \end{bmatrix} \begin{bmatrix} f_1 \\ f_2 \\ \vdots \\ \vdots \\ f_N \end{bmatrix} \quad (S2.14)$$

or, $$g = Hf \quad (S2.15)$$

where, $$h_{mn} = E_{mn}^{rx} E_{mn}^{tx} F \quad (S2.16)$$

and $E_{mn}^{tx}$ is the $m^{th}$ transmit aperture field distribution and $E_{mn}^{rx}$ is the $m^{th}$ receive aperture distribution. Transmit and receive apertures may simultaneously have the same field pattern and may even be the same aperture. In the case of the metamaterial imager presented in the main text, $E_{mn}^{tx}$ is the radiation pattern of a pyramidal horn antenna and $E_{mn}^{rx}$ is the radiation pattern of the metamaterial antenna, where m indexes over the measurement frequency. F is assumed to be a constant. Equations S2.15 and S2.16 form a complete expression of the imaging problem from a computational imaging standpoint.

S3. Electric Field on a One-Dimensional Aperture

This section discusses an approach to finding the aperture electric field on a one-dimensional strip of elements, fed by a single-mode waveguide.

To a first approximation, the aperture field of a one-dimensional metamaterial waveguide aperture can be solved as used in this work using a transfer-matrix method. This model may be incomplete—as it may fail to account for surface-wave coupling that occurs between the metamaterial elements—but it suffices to give a qualitative view of the aperture field. Once the aperture field is known, the rest of the imaging problem follows described herein.

Figure 17B:
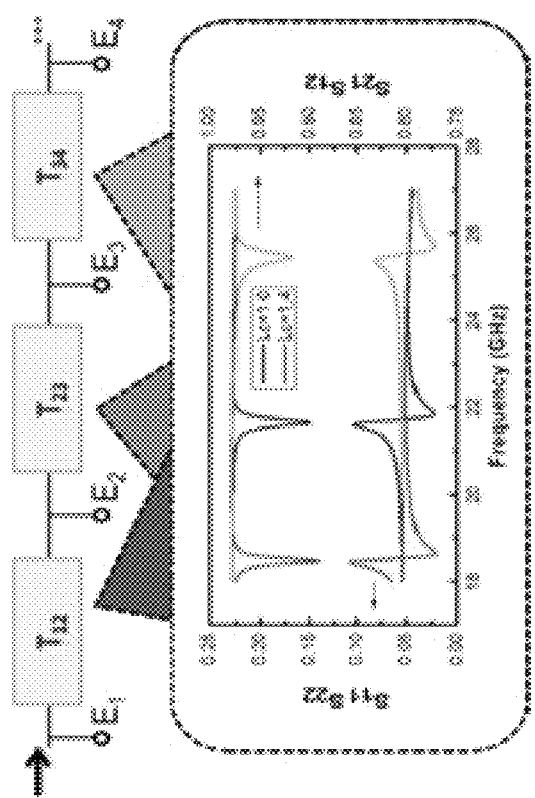
FIGS. 17A and 17B are graphs and images representing the transfer-matrix method, respectively, in accordance with an embodiment of the present disclosure.
Figure 17A:
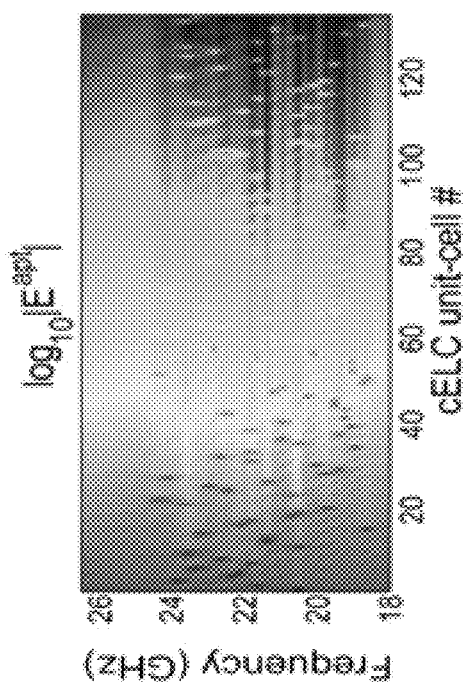

We treat each cELC as a lumped circuit element with a scattering transmission (T-) matrix obtained by full-wave finite element simulation of the unit-cell. FIG. 17A depicts this approach, which is derived in detail here. At each node, the forward and backward propagating waves may be expressed as $$E_1 = E_1^+ e^{i\beta x} + E_1^- e^{-i\beta x} \quad (S3.1)$$

The transfer function across each cell, written in T-parameters is $$\begin{bmatrix} E_1^+ \\ E_1^- \end{bmatrix} = \begin{bmatrix} T_{11} & T_{21} \\ T_{12} & T_{22} \end{bmatrix} \begin{bmatrix} E_2^+ \\ E_2^- \end{bmatrix} \quad (S3.2)$$

$$\begin{bmatrix} T_{11} & T_{21} \\ T_{12} & T_{22} \end{bmatrix} = \begin{bmatrix} \frac{-\det(S)}{S_{21}} & \frac{-S_{22}}{S_{21}} \\ \frac{S_{11}}{S_{21}} & \frac{1}{S_{21}} \end{bmatrix} \quad (S3.3)$$

These lumped circuits are evenly distributed down the length of a transmission line as N unit-cells, each with its own T-matrix, which provides a system of N linear equations for the N+1 node voltages (with a known input voltage). Then, by unit-cell symmetry and mean-value theorem, the complex electric field at the center of unit-cell n is the average of the inward traveling waves can be written as:

$$E_a^{WG} = (E_a^+ + E_{a+1}^-)/2 \quad (S3.4)$$

$E_a^{WG}$ is effectively the electric-field which drives the cELC metamaterial resonator element. The cELC unit-cells behave nearly as dipoles, which allows us to relate this driving field to the radiative field on the aperture $$E_a^{Apt} = E_{apt}^{WG} \frac{A_n}{(f_{0a}^2 - f^2) + if\Gamma_2} \quad (S3.5)$$

where $\Gamma_n$ and $A_n$ are fit to the s-parameters. FIG. 17B plots the solution for the amplitude of the waveguide driving field $|E^{WG}|$ and the radiative aperture field $|E^{APt}|$ for the random element design used in the equipment.

S4. Quality Factor in Frequency-Agile Apertures

Using a frequency sweep to create a set of unique measurement modes requires that the complex electric field at points along the aperture be sufficiently distinct for different frequencies. When a limited bandwidth is utilized, the spacing between frequencies becomes constricted by the number of modes to be used. For example, 101 modes over K-band means mode frequencies can be separated by 45 MHz. For aperture points spatially separated by large distances, or for large frequency differences, the differential phase advance in the waveguide ensures this condition—as in the operation of a traditional leaky-slotted waveguide used for a conventional frequency-scanned-array. For nearby points, however, there is almost no phase difference in the waveguide, and the resonance of the metamaterial elements is relied on to spatially distinguish the aperture field. This consideration leads to a design approach for the cELC elements which prioritizes quality-factor (the sharpness of the resonance in frequency space), as described below in section S5.

S5. Design of the Complementary-ELC Resonator Geometry

The cELC metamaterial element can behave similar to the common ELC element, but for swapped electric and magnetic polarization vectors. It may behave similar to a cascaded RLC bandpass network for free-wave propagation. The various geometry dimensions may affect the resistance, inductance, and capacitance, which in turn modify the characteristics of sections of the RLC network:

$$f_0 = \frac{1}{\sqrt{LC}}, \quad Q_{series} = R\sqrt{C/L}, \quad Q_{parallel} = R^{-1}\sqrt{R/C}$$

To explore the design space of the cELC, full-wave solutions have been performed using the finite-element code of Microwave Studio by Computer Simulation Technologies. The result of this investigation is an effective circuit model, shown in FIG. 18A, which describes the interplay of the different geometries. Once the parameter space is understood, one design may be treated as an optimization problem subject to the following tiered priority-list:

1) Enable control of the resonance frequency across the K-band spectrum using a geometric parameter, relatively insensitive to fabrication tolerances.
2) Maximize the quality factor Q of the resonator.
3) Minimize the radiative coupling A of the resonator to the waveguide.
4) Minimize interdependence of $f_0$ and Q & A.

Each of the capacitance and inductance values can be controlled by a length and a width. The process for final selection of these lengths and widths may be as follows: the geometric extents shown in FIG. 18A are varied within the fabrication constraint that the minimum feature size is 100 µm. The length of the #3 metal strip ($L_3$) has been identified as single geometric feature which enables control of the resonance frequency across the entire K-band. It was observed that maximizing the parallel capacitance $C_2$ and $C_4$ may maximize Q, so these widths $w_2$ and $w_4$ can be set to the minimum (100 μm). $C_1$ may be minimized, and so the width $w_1$ can be set to a comparatively large 200 μm. After this point, the other geometric parameters are trade-offs, which may be investigated as an optimization matrix of $Q(w_3, I_2)$, $A(w_3, I_2)$, $f0(w_3, I_2)$, and Q/A, shown in FIG. 18B. The selected final geometry uses $I_2$=350 μm and $w_3$=100 μm.

S6. Image Reconstruction

A scene measurement with the metamaterial imager may include a scan of the illumination and detection frequency giving a complex electric field measurement at each frequency. Thus, the measurement vector g can be a frequency spectrum of the bistatic transmission of the imaging system. As discussed in section S2, this is described by the linear equation g=Hf where f is the unknown scene scattering density (i.e., the image desired to determine), H describes the imaging system's radiation pattern versus frequency, and g is the measured transmission spectrum. The problem of reconstructing the image can be solved by finding the solution to the optimization problem.

$$f_{est} = \text{argmin}_f \|g - Hf_{est}\|_2^2 + \lambda \|f_{est}\|_1$$

Because the scene is known to consist of few and small point-objects, it is expected to be sparse in the canonical basis so it is chosen to minimize the $l_1$-norm of the estimated image.

Numerous algorithms may be used for solving this optimization problem. We have used the Two-step Iterated Soft Thresholding algorithm (TwIST), proposed by Bioucas-Dias and Figueiredo, may be utilized. The regularization parameter $\lambda$ can be hand-tuned to produce a noise-free image for one still frame image and this value was then used for all other reconstructions without modification (each scene was not separately tuned).

S7. Comparison of Scanned Beam Imaging Versus Metamaterial Aperture Imaging

There exists a tradeoff between the advantages of high signal-to-noise (SNR) and high mode-diversity for different imaging scenarios. High mode-diversity allows undersampling of the scene, and thus utilization of non-linear compressive sensing reconstruction techniques. Mode-diversity also ultimately spatially distributes the available output power, reducing the SNR from a canonically sparse scene. Here we discuss this tradeoff, comparing a metamaterial imager leveraging mode-diversity to a raster-scanning imager.

For a fixed scene illumination power and aperture size, a good SNR may be provided by raster scanning a diffraction-limited beam across the scene, which yields an identity measurement matrix, H=I. However, the raster scanned beam imager contains no mode-diversity, which means as the number of measurements is reduced from the space-bandwidth product of the scene, the scanned beam begins to entirely miss scene points. In these cases, zero information about parts of the scene is obtained and, even non-linear compressive sensing reconstruction techniques cannot correctly reconstruct the scene. Thus, the average reconstruction error for a scanned beam imager increases rapidly with undersampling.

On the other hand, an aperture with random amplitude and phase, which the metamaterial imaging aperture presented in the main text approximates, may have a reduced gain distributed across the entire scene. This reduced gain may yield reduced SNR compared to a scanned beam imager, but ensures that all parts of the scene are sensed even when the scene is drastically undersampled. With the aid of non-linear estimators, this allows canonically sparse scenes undersampled with random modes to be reconstructed with high accuracy, provided the system noise is sufficiently low.

Figure 19B:
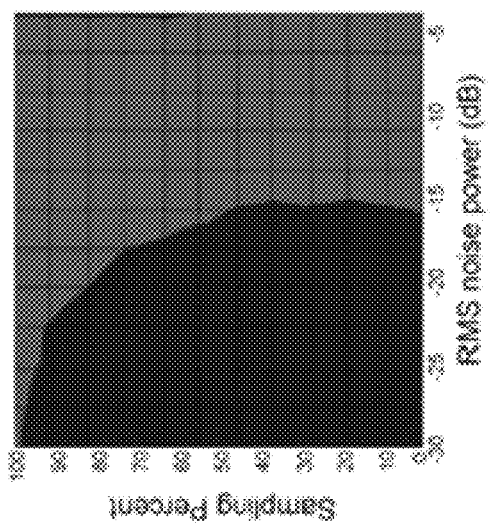
FIGS. 19A and 19B are graphs show the best average error for TwIST reconstructions in accordance with an embodiment of the present disclosure. The reconstructions are of one- and two-point scenes measured with a scanned beam imager (red), and the metamaterial aperture imager presented in the main text (blue). The error is the average Euclidian distance between the reconstructed distance between the reconstructed images and the true images for the optimal regularization parameter.
Figure 19A:
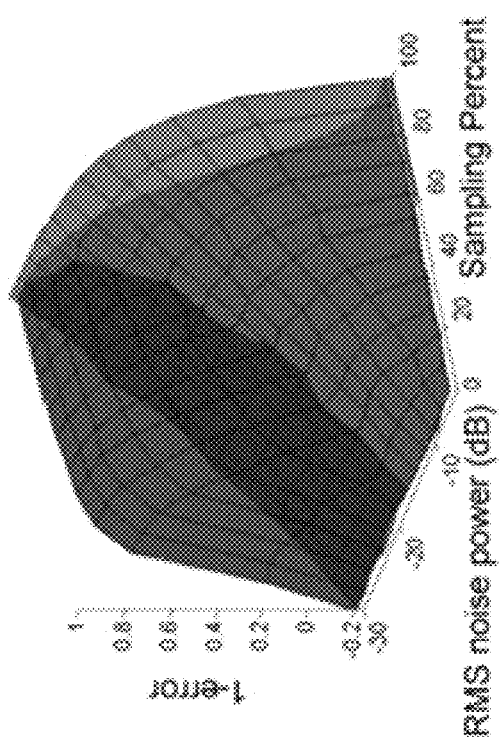

To demonstrate this tradeoff, the imaging and reconstruction of one dimensional (cross range only) one- and two-point scenes under different noise and undersampling conditions may be simulated using an ideal scanned beam imager and the metamaterial imager presented in the main text. In a Monte Carlo investigation, a series of randomly generated scenes consisting of either one or two diffraction limited points are imaged with M measurements using either scanned-beam imager or metamaterial imager, and white Gaussian noise with RMS power n is added to the measurement. These scenes are then reconstructed using TwIST with various regularization parameters and the resulting Euclidean distances from the true scenes for each regularization parameter are averaged. The lowest average error is selected as the best average reconstruction error for that number of measurements and noise level. The best average errors are compared in FIGS. 19A and 19B.

Any patents or publications mentioned in this specification are indicative of the levels of those skilled in the art to which the invention pertains. These patents and publications are herein incorporated by reference to the same extent as if each individual publication was specifically and individually indicated to be incorporated by reference.

One skilled in the art will readily appreciate that the present invention is well adapted to carry out the objects and obtain the ends and advantages mentioned, as well as those inherent therein. The present examples along with the methods described herein are presently representative of preferred embodiments, are exemplary, and are not intended as limitations on the scope of the invention. Changes therein and other uses will occur to those skilled in the art which are encompassed within the spirit of the invention as defined by the scope of the claims.

REFERENCES

1. E. J. Candes, E. J. Candes, Proceedings on the International Congress of Mathematics, 1433-1452 (2006) http://dialnet.unirioja.es/servlet/dcart?info=link&codigo=3140640&orden=237292.
2. D. L. D. Donoho, Information Theory, IEEE Transactions on. 52, 1289-1306 (2006) http://ieeexplore.ieee.org/xpls/abs_all.jsp?arnumber=1614066.
3. C. F. Cull, D. a Wikner, J. N. Mait, M. Mattheiss, D. J. Brady, Applied optics. 49, E67-82 (July 2010) http://www.ncbi.nlm.nih.gov/pubmed/20648123.
4. E. Abbe, Journal of the Royal Microscope Society. 2, 790-812 (1883).
5. A. W. Lohmann, Research Paper RJ-438 (IBM San Jose Research Laboratory, San Jose, Calif.), 1-23 (1967).
6. D. J. Brady, Optical Imaging and Spectroscopy (John Wiley & Sons, Inc., Hoboken, N.J., USA, March 2008) http://doi.wiley.com/10.1002/9780470443736.
7. E. J. Candès, Comptes Rendus Mathematique. 346, 589-592 (May 2008) http://www.sciencedirect.com/science/article/pii/S1631073X08000964.
8. D. Brady, K. Choi, D. L. Marks, R. Horisaki, S. Lim, Optics Express. 17 (2009).
9. L. Potter, E. Ertin, J. Parker, M. Cetin, Proceedings of the IEEE. 98 (2010).
10. J. B. Pendry, D. Schurig, D. R. Smith, Science. 312, 1780-1782 (2006) http://www.sciencemag.org/content/312/5781/1780.short.

11. T. Driscoll et al., Applied Physics Letters. 081101 (2006) http://link.aip.org/link/?APPLAB/88/081101/1.
12. N. B. Kundtz, D. R. Smith, Nature materials. 9, 129-132 (February 2010) http://www.ncbi.nlm.nih.gov/pubmed/20023631.
13. Y. Urzhumov, D. R. Smith, Physical Review B. 83, 31-33 (May 2011) http://prb.aps.org/abstract/PRB/v83/i20/e205114.
14. E. E. Narimanov, Nature Materials. 7 (2008).
15. Z. Jacob, L. V. Alekseyev, E. Narimanov, Optics express. 14, 8247-56 (September 2006).
16. M. B. Wakin et al., Computational Imaging. IV, 606509 (2006).
17. W. L. Chan et al., Applied Physics Letters. 93, 121105 (2008) http://link.aip.org/link/APPLAB/v93/i12/p121105/s1&Agg=doi.
18. W. L. Chan et al., Applied Physics Letters. 94, 213511 (2009) http://link.aip.org/link/APPLAB/v94/i21/p213511/s1&Agg=doi.
19. A. Mahalanobis, M. Neifeld, V. K. Bhagavatula, T. Haberfelde, D. Brady, Applied optics. 48, 5212-24 (October 2009) http://www.ncbi.nlm.nih.gov/pubmed/19798359.
20. R. Liu, X. Yang, J. Gollub, J. J. Mock, T. Cui, Applied Physics Letters, 5-7 (2009) http://scholar.google.com/scholar?hl=en&btnG=Search&q=intitle:Gradient+index+circuit+by+waveguided+metamaterials#0.
21. J. D. Baena et al., Microwave Theory and Techniques, IEEE Transactions on. 53, 1451-1461 (2005) http://ieeexploreleee.org/xpls/abs_all.jsp?arnumber=1420785.
22. J. M. Bioucas-Dias, M. a T. Figueiredo, IEEE transactions on image processing: a publication of the IEEE Signal Processing Society. 16, 2992-3004 (December 2007).
23. W. J. Padilla, A. J. Taylor, C. Highstrete, M. Lee, R. D. Averitt, Phys. Rev. Lett. 96107401 (2006).
24. T. Driscoll, H. Kim, B. Chae, B. Kim, Y. Lee, Science. 315, 1518 (2009) http://www.sciencemag.org/content/325/5947/1518.short.
25. H. T. Chen et al., Nature. 444, 597-600 (2006) http://www.nature.com/nature/journal/v444/n7119/abs/nature05343.html.
26. D. Shrekenhamer et al., Science. 600, 597-600 (2008).
27. Z. Xu, E. Y. Lam, Journal of the Optical Society of America. A, Optics, image science, and vision. 27, 1638-46 (July 2010) http://www.ncbi.nlm.nih.gov/pubmed/20596150.

What is claimed:

1. A method, comprising:
    illuminating a scene with a set of illumination field patterns corresponding to a set of measurement frequencies;
    observing the illuminated scene with a set of measurement field patterns corresponding to the set of measurement frequencies; and
    reconstructing an image of the observed scene using a compressive imaging algorithm;
    where the set of illumination field patterns or the set of measurement field patterns is a set of field patterns of a metamaterial aperture antenna.

2. The method of claim 1, wherein the illumination field patterns are field patterns of a low-directivity horn antenna and the measurement field patterns are field patterns of the metamaterial aperture antenna.

3. The method of claim 1, wherein the measurement field patterns are radiation patterns of a low-directivity horn antenna and the illumination field patterns are field patterns of the metamaterial aperture antenna.

4. The method of claim 1, wherein both the measurement field patterns and the illumination field patterns are field patterns of the metamaterial aperture antenna.

5. The method of claim 1, wherein the set of measurement frequencies is a set of RF frequencies.

6. The method of claim 1, wherein the set of measurement frequencies is a set of microwave frequencies.

7. The method of claim 1, wherein the set of measurement frequencies is a set of mmW frequencies.

8. The method of claim 1, wherein the set of field patterns of the metamaterial aperture antenna is a set of pseudo-random field patterns.

9. The method of claim 1, wherein the metamaterial aperture antenna includes:
    a waveguide; and
    an array of metamaterial elements coupled to the waveguide.

10. The method of claim 9, wherein the metamaterial elements have distributed resonant frequencies.

11. The method of claim 10, wherein the distributed resonant frequencies correspond to varied geometries of the metamaterial elements.

12. A system, comprising:
    a signal source;
    a signal detector;
    a metamaterial aperture antenna coupled to the signal source or the signal detector and having a set of field patterns for compressive sampling at a set of measurement frequencies.

13. The system of claim 12, wherein the metamaterial aperture antenna is coupled to the signal source, and the system further comprises:
    a low-directivity horn antenna coupled to the signal detector.

14. The system of claim 12, wherein the metamaterial aperture antenna is coupled to the signal detector, and the system further comprises:
    a low-directivity horn antenna coupled to the signal source.

15. The system of claim 12, wherein the metamaterial aperture antenna is coupled to both the signal source and the signal detector.

16. The system of claim 12, wherein the set of measurement frequencies is a set of RF frequencies.

17. The system of claim 12, wherein the set of measurement frequencies is a set of microwave frequencies.

18. The system of claim 12, wherein the set of measurement frequencies is a set of mmW frequencies.

19. The system of claim 12, wherein the set of field patterns of the metamaterial aperture antenna is a set of pseudo-random field patterns.

20. The system of claim 12, wherein the metamaterial aperture antenna includes:
    a waveguide; and
    an array of metamaterial elements coupled to the waveguide.

21. The system of claim 20, wherein the waveguide includes a bounding conductor and the metamaterial elements are complementary metamaterial elements patterned in the bounding conductor.

22. The system of claim 20, wherein the waveguide is a one-dimensional waveguide.

23. The system of claim 22, wherein the one-dimensional waveguide is a microstrip line.

24. The system of claim 20, wherein the waveguide is a two-dimensional waveguide.

25. The system of claim 24, wherein the two-dimensional waveguide is a parallel plate waveguide.

26. The system of claim 20, wherein the metamaterial elements have distributed resonant frequencies.

27. The system of claim 26, wherein the distributed resonant frequencies correspond to varied geometries of the metamaterial elements.

* * * * *